(12) United States Patent
Mori et al.

(10) Patent No.: US 6,633,380 B1
(45) Date of Patent: Oct. 14, 2003

(54) WAVELENGTH CHARACTERISTIC MEASUREMENT APPARATUS

(75) Inventors: Tohru Mori, Tokyo (JP); Takashi Iwasaki, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/561,450

(22) Filed: Apr. 28, 2000

(30) Foreign Application Priority Data

Apr. 30, 1999 (JP) .............................................. 11-125373

(51) Int. Cl.[7] .............................. G01J 3/06; G01J 3/12
(52) U.S. Cl. ..................... 356/308; 356/326; 356/332
(58) Field of Search ................................ 356/300, 326, 356/332, 328, 334, 308

(56) References Cited

U.S. PATENT DOCUMENTS 4,037,960 A  7/1977  Macemon 6,512,582 B1 * 1/2003 Mori et al. ................. 356/308

FOREIGN PATENT DOCUMENTS

EP  0 692 709 A1  1/1996
GB  2 293 650  4/1996

* cited by examiner

Primary Examiner—Frank G. Font
Assistant Examiner—Andrew H. Lee
(74) Attorney, Agent, or Firm—Fish & Richardson P.C.

(57) ABSTRACT

An optical spectrum analyzer 100 and a wavelength variable light source 101 have each a sweep synchronization start function. A correction function of the rotation speed of a motor 106 for varying the angle of a diffraction grating in a spectroscope 104 so that extracted wavelength and output signal light wavelength match over a setup sweep wavelength range is found from the output signal light wavelength characteristic relative to the rotation angle of a spectral element 119 and the extracted wavelength of the spectroscope 104, and the rotation angle of motor 106 for driving the spectroscope 104 is varied for each setup wavelength in accordance with the correction function, then sweep is performed.

7 Claims, 15 Drawing Sheets

WAVELENGTH CHARACTERISTIC MEASUREMENT APPARATUS

BACKGROUND OF THE INVENTION

1. Field of the Invention

This invention relates to a wavelength characteristic measurement apparatus for measuring the light wavelength characteristic of an optical component such as an optical filter or an optical transmission line and more particularly to a wavelength tracking control technique in wavelength characteristic measurement using an optical spectrum analyzer for measuring the spectrum of an optical signal and a wavelength variable light source capable of outputting different wavelengths.

2. Description of the Related Art

FIG. 21 is a block diagram to show an apparatus configuration example in a related art for embodying wavelength tracking in wavelength characteristic measurement using an optical spectrum analyzer and a wavelength variable light source. In the figure, numeral 100 denotes an optical spectrum analyzer for measuring an optical spectrum and numeral 101 denotes a wavelength variable light source capable of outputting different wavelengths.

The optical spectrum analyzer 100 comprises a control section 102 for controlling the whole operation of the optical spectrum analyzer 100, a communication circuit 103 for carrying out communications with an external machine (in this case, the wavelength variable light source 101), a terminal ③ used as an input/output interface of the communication circuit 103, a spectroscope 104 for extracting and outputting a specific wavelength from measured light by a spectrum using a spectral element of a diffraction grating, a prism, an interference filter, etc., an optical input terminal 105 for inputting measured light given from the outside to the spectroscope 104, a motor 106 for varying the extracted wavelength of the spectroscope 104, a drive circuit 107 for driving the motor 106 in accordance with the conditions of the motor rotation speed, rotation quantity, etc., set from the control section 102, a position detection circuit 108 for detecting the rotation quantity and the rotation position of the motor 106, a photodetector 110 for receiving the extracted light output from the spectroscope 104 and converting the light into an electric signal, an amplification circuit 111 for amplifying the minute electric signal output from the photodetector 110, an A/D (analog-digital) converter 112 for quantizing an analog signal output from the amplification circuit 111 and converting the signal into a digital signal, and a display section 113 for displaying an optical spectrum provided by plotting measurement data output from the A/D converter 112.

The control section 102 drives the motor 106 by the drive circuit 107 to set the extracted wavelength of the spectroscope 104 to any desired value based on motor control information previously stored in the control section 102. The control section 102 checks position information provided by the position detection circuit 108 connected to the motor 106 to ensure that the extracted wavelength of the spectroscope 104 is set to the desired value, then reads measurement data from the A/D converter 112, performs predetermined operation processing, and displays the operation result on the display section 113.

At this time, the control section 102 finds each wavelength at equal intervals as the extracted wavelength of the spectroscope 104 based on the wavelength range and the number of measurement samples set by the measurer and while intermittently finding measurement data provided when the extracted wavelength of the spectroscope 104 is set to each wavelength at equal intervals, the control section 102 plots the measurement data on the display section 113, whereby it is made possible to display the measurement waveform of the spectrum concerning the measured light.

The optical spectrum analyzer 100 has a function as a host for controlling the external wavelength variable light source 101 connected to the optical spectrum analyzer 100. That is, the control section 102 transmits a control instruction to a control section 115 (described later) of the wavelength variable light source 101 via the communication circuit 103 and the terminal ③ and a terminal ③' and a communication circuit 116 (both described later) of the wavelength variable light source 101, thereby setting the wavelength and light power of signal light output by the wavelength variable light source 101.

A measured object is an optical component whose wavelength characteristic such as a wavelength versus loss characteristic is to be measured, such as an optical component for WDM (wavelength division multiplexing), an optical fiber grating, or a dielectric multilayer film filter. Measured light is supplied from the measured object 114 to the optical spectrum analyzer 100 by wavelength tracking measurement using single mode signal light supplied from an optical output terminal 118 (described later) of the wavelength variable light source 101, and the wavelength characteristic of the measured object 114 is measured.

On the other hand, the wavelength variable light source 101 comprises a control section for controlling the whole operation of the wavelength variable light source 101, the communication circuit 116 for carrying out communications with an external machine (in this case, the optical spectrum analyzer 100), the terminal ③' used as an input/output interface of the communication circuit 116, the optical output terminal 118 for outputting an optical signal output from a light source 122 (described later) to the external measured object 114, the light source 122 for oscillating a single mode spectrum with its oscillation wavelength being variable, a light source drive circuit 123 for driving the light source 122 and performing temperature control, etc., of the light source 122, a display section 124 for displaying conditions of the measurement wavelength range, etc., set by the measurer (described later in detail), and a wavelength control circuit 126 for controlling the wavelength of the optical signal output from the light source 122.

The control section 115 controls the light source drive circuit 123 and the wavelength control circuit 126 based on the light source drive information and the wavelength information previously stored in the control section 115 and varies single mode oscillation wavelength and oscillation light power of the light source 122. That is, the control section 115 finds parameters of the measurement wavelength interval, etc., (described later in detail) based on the setup conditions by performing operations, gives instructions to the light source drive circuit 123 and the wavelength control circuit 126, and oscillates the light source 122 under an arbitrary setup condition. In addition, the control section 115 intermittently changes the oscillation wavelength of the light source 122 at predetermined wavelength intervals throughout the wavelength range set by the measurer. Like the optical spectrum analyzer 100, the wavelength variable light source 101 also uses a spectral element (not shown) and a motor (not shown) for driving the spectral element to vary the oscillation wavelength of the light source 122.

Next, the procedure of wavelength tracking control performed in the wavelength characteristic measurement apparatus in the related art will be discussed according to a flowchart shown in FIG. 22. The control in the optical spectrum analyzer 100 and the wavelength variable light source 101 as described below may be performed using a computer, etc., provided aside from them. First, the measurer sets measurement conditions of measurement start wavelength λ0, measurement end wavelength λe, the number of measurement samples, etc., in the optical spectrum analyzer 100. Then, the control section 102 derives parameters of wavelength interval Δλ, etc., by performing operations based on the setup measurement conditions (step S1).

Next, the control section 102 sends a signal to the drive a circuit 107 in accordance with the found parameters, thereby driving the motor 106 for setting the extracted wavelength of the spectroscope 104 to one initial wavelength, and checks position information output from the position detection circuit 108 to ensure that the extracted wavelength of the spectroscope 104 is set to the initial wavelength. The control section 102 also transmits a "move command to initial wavelength" to the wavelength variable light source 101 via the communication circuit 103 and the terminal ③ (step S2).

Then, the control section 115 of the wavelength variable light source 101 finds parameters given to the light source drive circuit 123 and the wavelength control circuit 126 by performing operations based on the command transmitted via the communication circuit 116 from the optical spectrum analyzer 100, and supplies the parameters to the circuits. The oscillation wavelength of the light source 122 is set to the initial wavelength based on the parameters. After the termination of the setting, a "wavelength setting completion command" is transmitted to the control section of the optical spectrum analyzer 100 via the communication circuit 116 (if the decision result at step S3 is YES).

Next, when the measurer gives a measurement start instruction to the optical spectrum analyzer 100 (step S4), the control section 102 sends a control signal to the drive circuit 107 for driving the motor 106 so that the extracted wavelength λ of the spectroscope 104 becomes the measurement start wavelength λ0, monitors position information output from the position detection circuit 108, and waits for move completion of the motor 106. The control section 102 transmits a "move command to measurement wavelength λ (namely, measurement start wavelength λ0)" to the wavelength variable light source 101 via the communication circuit 103, then waits for return of a "wavelength setting completion command" from the wavelength variable light source 101 as with the case of the initial wavelength described above (step S5).

If wavelength setting in the optical spectrum analyzer 100 and the wavelength variable light source 101 is thus complete (if the decision result at step S6 is YES), the control section 102 starts the A/D converter 112 and reads a digital signal from the A/D converter 112 (step S7), then calculates the light power value based on the preset condition of the amplification circuit 111 and the like and plots the light power value on the display section 113 (step S8).

Next, the control section 102 finds the next measurement wavelength λ at a distance of wavelength interval Δλ from the current measurement wavelength λ it by performing operation (step S9) and again sets the extracted wavelength of the spectroscope 104 and the output wavelength of the wavelength variable light source 101. Then, the operation at steps S5 to S9 is repeated in the optical spectrum analyzer 100 and the wavelength variable light source 101. The control section 102 continues the wavelength setting and data measurement until the measurement wavelength exceeds the measurement end wavelength λe (the decision result at step S10 is YES).

Thus, in the wavelength tracking control in the related art in the optical spectrum analyzer and the wavelength variable light source, the optical spectrum analyzer 100 as the host controls the operation of the wavelength variable light source 101 via the communication interface. Then, the extracted wavelength of the spectroscope 104 and the output wavelength of the wavelength variable light source 101 are intermittently set for measurement every measurement wavelength interval found over the setup sweep wavelength range (measurement wavelength range) and further the commands are transferred between the optical spectrum analyzer 100 and the wavelength variable light source 101 via the communication interface. Thus, a problem of requiring much time for the wavelength tracking is involved.

To sweep the spectroscope 104 of the optical spectrum analyzer 100 and the light source 122 of the wavelength variable light source 101, the change characteristic of the extracted wavelength relative to the rotation quantity of the motor 106 for driving the spectroscope 104 rarely matches the change characteristic of the output wavelength relative to the rotation quantity of the motor for driving the spectral element of the wavelength variable light source 101; the change characteristics differ from each other in most cases. The reason why they differ is that the change characteristic of the spectroscope 104 is determined by various factors of the characteristic of the spectral element forming the spectroscope 104, the technique for varying the angle of the spectral element, the layout of the spectroscope 104, etc., and that the change characteristic concerning the spectral element of the wavelength variable light source 101 is also determined by various similar factors.

Thus, if the motors installed in the optical spectrum analyzer 100 and the wavelength variable light source 101 are rotated at uniform rate, the extracted wavelength of the spectroscope 104 and the output wavelength of the wavelength variable light source 101 relative to the rotation quantities of the motors change in response to their respective characteristics. Thus, the wavelength difference between the extracted wavelength and the output wavelength becomes large and it becomes impossible to perform tracking; consequently, wavelength tracking can be executed only in a very small wavelength range.

SUMMARY OF THE INVENTION

It is therefore an object of the invention to provide a wavelength characteristic measurement apparatus wherein to execute wavelength characteristic measurement using an optical spectrum analyzer and a wavelength variable light source, both sweeps are synchronized with each other, the wavelength characteristic measurement apparatus capable of matching the extracted wavelength of the optical spectrum analyzer and the output signal light wavelength of the wavelength variable light source with each other or making a narrow wavelength difference therebetween and performing wavelength tracking at high speed and with high wavelength accuracy over a wide wavelength range.

To the end, according to a first aspect of invention, there is provided a wavelength characteristic measurement apparatus using a wavelength variable light source for outputting signal light and an optical spectrum analyzer for measuring a spectral distribution of measured light provided by making the signal light incident on a measured object to measure the optical wavelength characteristic of the measured object, characterized in that the optical spectrum analyzer comprises spectral means for extracting a specific wavelength component from the measured light by a first spectral element and first drive means for varying the angle of the first spectral element and sweeping the extracted wavelength over a predetermined sweep wavelength range, that the wavelength variable light source comprises an external oscillator made up of a laser element for outputting single mode signal light as the signal light and a second spectral element for causing the laser element to lase at an arbitrary wavelength and second drive means for varying the angle of the second spectral element and sweeping the signal light wavelength of the signal light over the sweep wavelength range, and that the first and second drive means have each means for synchronizing sweep start with each other and vary and control the rotation angle of the first or second spectral element in accordance with a rotation correction function derived from the extracted wavelength characteristic relative to the rotation angle of the first spectral element and the signal light wavelength characteristic relative to the rotation angle of the second spectral element so that the extracted wavelength and the signal light wavelength match over the sweep wavelength range.

According to a second aspect of the present invention, in the wavelength characteristic measurement apparatus in the first aspect, the first drive means has a first motor for driving the first spectral element and controlling the rotation quantity and rotation speed of the first motor, thereby matching the extracted wavelength characteristic with the signal light wavelength characteristic, so that the extracted wavelength and the signal light wavelength are matched with each other over the sweep wavelength range.

According to a third aspect of the present invention, in the wavelength characteristic measurement apparatus in the first aspect, the second drive means has a second motor for driving the second spectral element and controlling the rotation quantity and rotation speed of the second motor, thereby matching the extracted wavelength characteristic with the signal light wavelength characteristic, so that the extracted wavelength and the signal light wavelength are matched with each other over the sweep wavelength range.

According to a fourth aspect of the present invention, there is provided a wavelength characteristic measurement apparatus using a wavelength variable light source for outputting signal light and an optical spectrum analyzer for measuring a spectral distribution of measured light provided by making the signal light incident on a measured object to measure an optical wavelength characteristic of the measured object, characterized in that the optical spectrum analyzer comprises spectral means for extracting a specific wavelength component from the measured light by a first spectral element, the spectral means having a wavelength transmission characteristic wherein the maximum transmission quantities are flat over a predetermined wavelength range preceding and following the extracted wavelength as the center relative to a preset resolution, and first drive means for varying the angle of the first spectral element and sweeping the extracted wavelength over a predetermined sweep wavelength range, that the wavelength variable light source comprises an external oscillator made up of a laser element for outputting single mode signal light as the signal light and a second spectral element for causing the laser element to lase at an arbitrary wavelength and second drive means for varying the angle of the second spectral element and sweeping the signal light wavelength of the signal light over the sweep wavelength range, and that the rotation speeds of the first and second motors for varying the angles of the first and second spectral elements respectively are previously determined so that the signal light wavelength converses in the predetermined wavelength range and the first and second drive means rotate the first and second motors at uniform rate in accordance with the rotation speeds.

According to a fifth aspect of the present invention, in the wavelength characteristic measurement apparatus in the fourth aspect, the sweep wavelength range is divided into a plurality of wavelength sections each wherein the signal light wavelength converses in the predetermined wavelength range, and the first and second drive means rotate the first and second motors at uniform rate in accordance with the rotation speeds of the first and second motors previously determined for each of the wavelength sections.

According to a sixth aspect of the present invention, in the wavelength characteristic measurement apparatus in the fifth aspect, the first and second drive means vary the pulse rates of the first and second motors in the middle of outputting a motor rotation pulse to the first and second motors.

According to a seventh aspect of the present invention, in the wavelength characteristic measurement apparatus in the fifth aspect, the first and second drive means once stop the sweep operation for each of the wavelength sections and set conditions concerning the next wavelength section to be swept, then sweep this wavelength section.

DETAILED DESCRIPTION OF THE PRESENT INVENTION

Referring now to the accompanying drawings, there are shown preferred embodiments of the invention.

First embodiment

Figure 1:
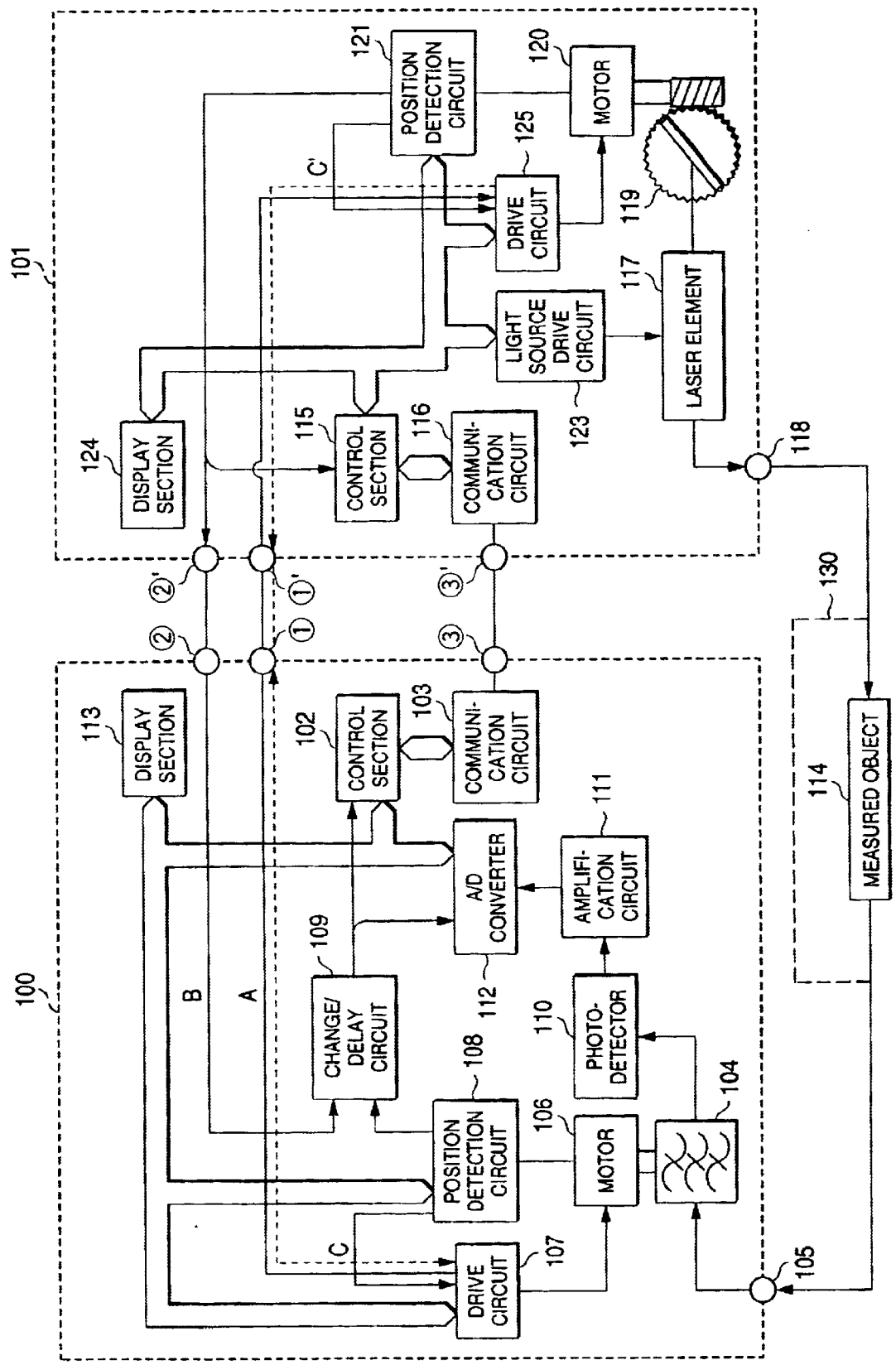
FIG. 1 is a block diagram to show the configuration of a wavelength characteristic measurement apparatus according to a first embodiment of the invention.
Figure 2:
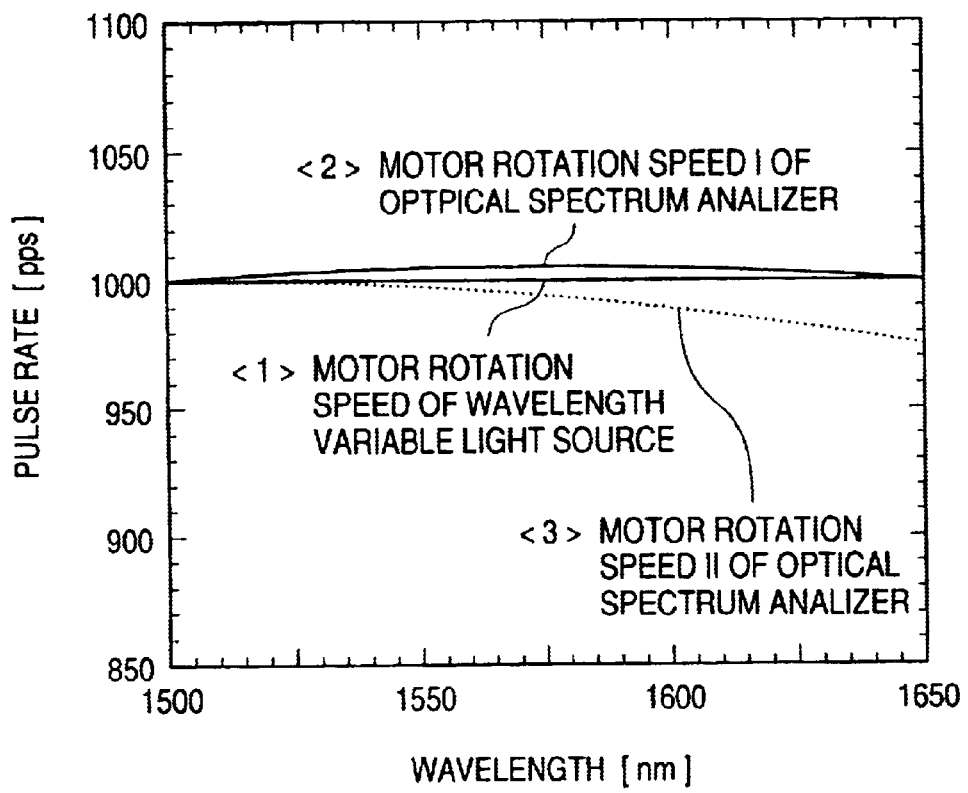
FIG. 2 is a schematic representation to show change in motor rotation speed for each of an optical spectrum analyzer and a wavelength variable light source in the first embodiment of the invention.
Figure 21:
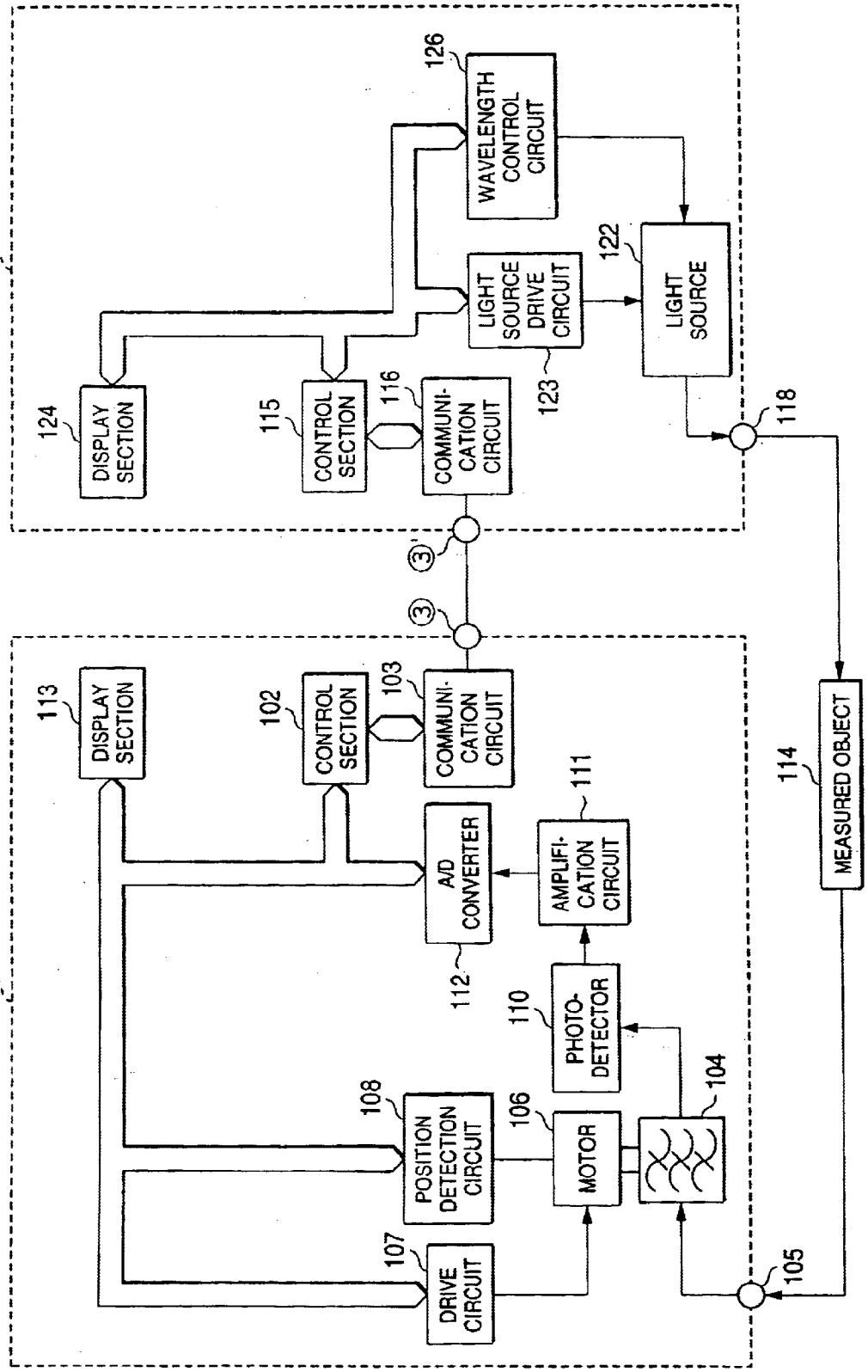
FIG. 21 is a block diagram to show the configuration of a wavelength characteristic measurement apparatus in a related art.
Figure 22:
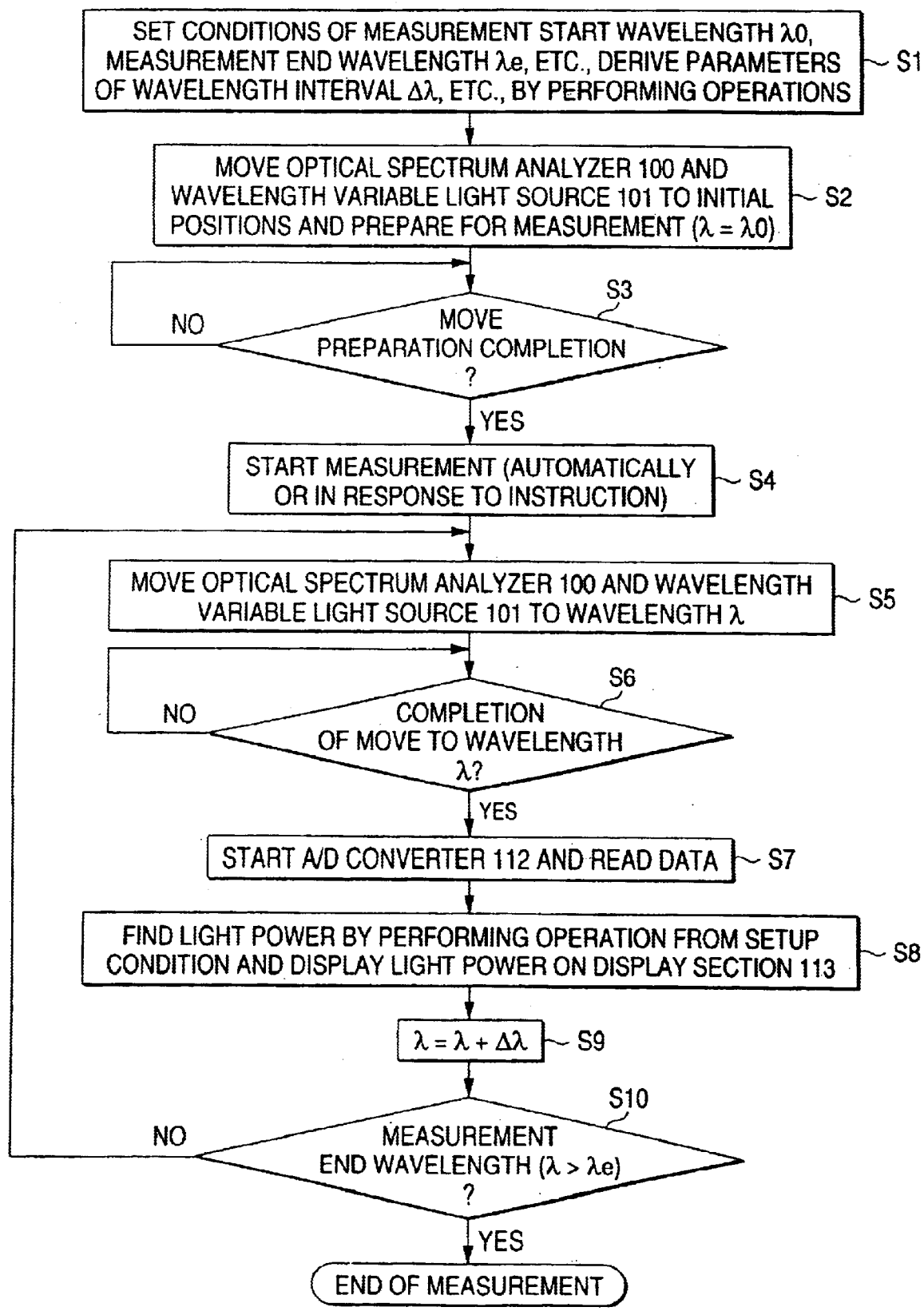
FIG. 22 is a flowchart to show the procedure of wavelength tracking of an optical spectrum analyzer and a wavelength variable light source performed in the wavelength characteristic measurement apparatus in the related art.

FIG. 1 is a block diagram to show the configuration of a wavelength characteristic measurement apparatus according to a first embodiment of the invention. Parts identical with those previously described with reference to FIG. 21 are denoted by the same reference numerals in FIG. 1. FIG. 2 is a schematic representation to show change in motor rotation speed in the first embodiment of the invention. The numeric values described in graphs referenced in embodiments including FIG. 2 are shown simply as examples, and the scope of the invention is not limited to the numeric values described in the graphs, needless to say.

In an optical spectrum analyzer 100 shown in FIG. 1, a drive circuit 107 of the first embodiment has a similar function to that in the related art, namely, the function of driving a motor 106 in accordance with conditions of the motor rotation speed, rotation quantity, etc., set from a control section 102. In addition, the drive Circuit 107 has a function of outputting a motor rotation start synchronizing signal (corresponding to symbol A in FIG. 1) when rotation of the motor 106 is started. In addition, the drive circuit 107 may have a function of starting rotation of the motor 106 in response to a motor rotation start synchronizing signal from the outside (in this case, a drive circuit 125 (described later) in a wavelength variable light source 101). In this case, the drive circuit 107 operates as a master and the drive circuit 125 operates as a slave. Conversely, the drive circuit 107 may operate as a slave and the drive circuit 125 may operate as a master. Thus, the signal A is a motor rotation start synchronizing signal for synchronizing the drive circuits 107 and 125 with each other to output a motor drive signal to the motor 106 and a motor 120 at the same timing from the drive circuits 107 and 125.

A terminal ① is a synchronizing signal output terminal for supplying the motor rotation start synchronizing signal output by the drive circuit 107 to an external machine (in this case, the wavelength variable light source 101) provided that the drive circuit 107 serves as the master. If the drive circuit 107 serves as the slave for starting rotation of the motor 106 in response to the motor rotation start synchronizing signal from the outside, namely, the drive circuit 125, the terminal ① becomes a synchronizing signal input terminal. A terminal ①' is a synchronizing signal input terminal for inputting the motor rotation start synchronizing signal supplied from an external machine (in this case, the optical spectrum analyzer 100) to the drive circuit 125 provided that the drive circuit 125 serves as the slave. If the drive circuit 125 serves as the master for supplying the motor rotation start synchronizing signal to the external machine, namely, the optical spectrum analyzer 100, the terminal ①' becomes a synchronizing signal output terminal.

Further, the drive circuit 107 has a function of varying the pulse rate for each motor rotation quantity corresponding to a divided wavelength section; the function is used in a third embodiment described later. To change the rotation speed of the motor 106 for each divided wavelength section in the third embodiment, a signal C is a signal for obtaining wavelength information used as a change point of the pulse rate of a drive signal output by the drive circuit 107 to the motor 106 from a position detection circuit 108. Thus, if the drive circuit 107 monitors the wavelength information by counting the output pulses of the drive signal or the like, the signal C becomes unnecessary. To change the rotation speed of the motor 120 installed in the wavelength variable light source 101 for each divided wavelength section and rotate the motor 106 at constant speed, the signal C also becomes unnecessary.

Next, the position detection circuit 108 in the embodiment has a similar function to that in the related art, namely, the function of detecting the rotation quantity and the rotation position of the motor 106 and also has a function of outputting a trigger pulse indicating that the rotation quantity of the motor 106 reaches a predetermined value to a change/delay circuit 109 (described just below) when the rotation quantity of the motor 106 reaches the rotation quantity corresponding to a specific wavelength set from the control section 102. As described in the drive circuit 107, the position detection circuit 108 in the third embodiment has a function of generating wavelength information of a change point of the pulse rate of a drive signal output by the drive circuit 107 to the motor 106.

Next, the change/delay circuit 109 changes a trigger pulse input from the position detection circuit 108 and a sampling timing signal (corresponding to a symbol B in the figure) input via a terminal ② from the wavelength variable light source 101 and notifies an A/D converter 112 and the control section 102 of the sampling timing. The change/delay circuit 109 also has a function of delaying the changed trigger pulse or sampling timing signal by a predetermined time preset by the control section 102.

That is, the signal B is a signal for supplying a sampling timing signal for the control section 102 to read digital data provided by A/D conversion of the started A/D converter 112 from a position detection circuit 121 installed in the wavelength variable light source 101 to the change/delay circuit 109. The terminal ② is a signal input terminal in the optical spectrum analyzer 100 to which the sampling timing signal is input. A terminal ②' is a signal output terminal for supplying the sampling timing signal output by the position detection circuit 121 to the external machine (in this case, the optical spectrum analyzer 100).

Next, the control section 102 in the embodiment has a function of controlling the blocks in the optical spectrum analyzer 100 and also has a function of reading the digital data output from the A/D converter 112 in synchronization with the sampling timing signal output from the change/delay circuit 109.

Next, the A/D converter 112 in the embodiment has a similar function to that in the related art, namely, the function of performing A/D conversion under the control of the control section 102 and also has a function of executing A/D conversion A of a signal output from an amplification circuit 111 and outputting digital data in synchronization with the sampling timing signal output from the change/delay circuit 109.

Next, in the wavelength variable light source 101, a laser element 117 is a light source for outputting single mode signal light; generally, it is a semiconductor laser element, but may be an optical fiber, etc., to which a rare earth element is added. The laser element 117 outputs natural emission light by raising the energy level as it is exited from the outside. In addition, if signal light having a specific wavelength is input, the laser element 117 amplifies the signal by stimulated emission and lases.

Next, a spectral element 119 and the laser element 117 make Up an external resonator. The spectral element 119 scatters wavelength using a diffraction phenomenon from natural emission light output from the laser element 117 and feeds back a wavelength component determined by the angle of the spectral element 119 itself into the laser element 117, thereby making it possible to lase at any desired wavelength. This means that the angle of the spectral element 119 is varied, whereby the wavelength of laser light provided by the laser element 117. Generally, a diffraction grating having a large number of grooves on a reflection face is used as the spectral element 119, but a prism, a multilayer film filter, etc., may be used.

Next, the motor 120 is provided for controlling the rotation angle of the spectral element 119 in accordance with a drive signal from the drive circuit 125. Generally, a stepping motor, a servomotor, etc., for controlling the rotation angle based on a pulse is used as a specific form of the motor 120, but any other type of motor may be used, of course.

Next, the position detection circuit 121 detects the rotation angle of the motor 120 and also outputs a sampling timing signal when the wavelength for the laser element 117 to lase reaches the target wavelength set by the control section 115.

To change the rotation speed of the motor 120 for each divided wavelength section in the third embodiment, a signal C' is a signal for outputting wavelength information used as the pulse rate change point of a drive signal output from the drive circuit 125 to the motor 120 from the position detection circuit 121 to the drive circuit 125. Thus, if the drive circuit 125 monitors the wavelength information by counting the pulses of the drive signal or the like, the signal C' becomes unnecessary. To change the rotation speed of the motor 106 installed in the optical spectrum analyzer 100 for each divided wavelength section and rotate the motor 120 at constant speed, the signal C' also becomes unnecessary.

The drive circuit 125, which is a control circuit for driving the motor 120, outputs a drive signal to the motor 120 in synchronization with a motor rotation start synchronizing signal supplied from the drive circuit 107 in the optical spectrum analyzer 100 through the terminals ①' and ① provided that the drive circuit 125 operates as the slave and the drive circuit 107 operates as the master. Therefore, if the drive circuit 125 operates as the master and the drive circuit 107 operates as the slave, the drive circuit 125 may output the motor rotation start synchronizing signal to the terminal ①' at the same timing as it outputs the drive signal to the motor 120

Figure 3:
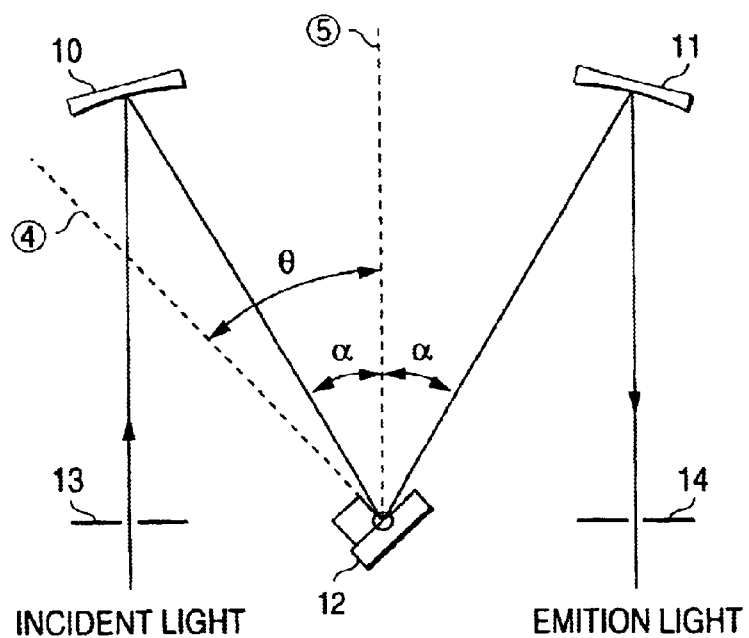
FIG. 3 is a drawing to show signal light incidence and emission on and from a spectral element and a schematic representation to show Zerni Turner placement in the first embodiment of the invention.
Figure 4:
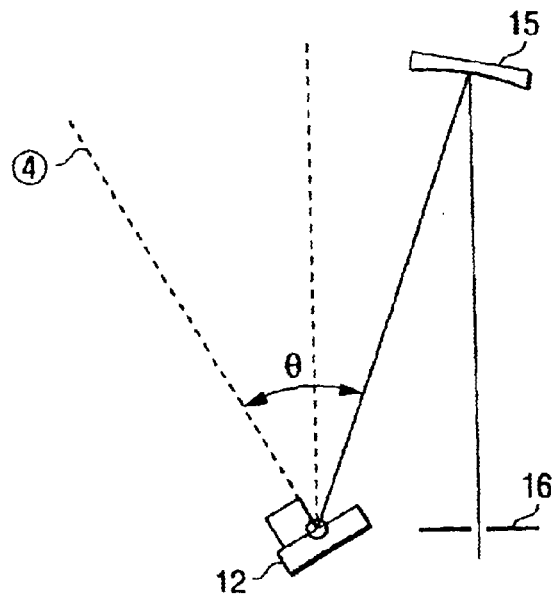
FIG. 4 is a drawing to show signal light incidence and emission on and from a spectral element and a schematic representation to show Littrow placement in the first embodiment of the invention.

Generally, a spectral element of a diffraction grating, a prism, etc., is used as the spectroscope 104 installed in the optical spectrum analyzer 100 to convert a wavelength parameter of signal light into an angle parameter and vary the angle of the spectral angle, thereby extracting the wavelength parameter. The configurations shown in FIGS. 3 and 4 are typical as a specific configuration of the spectroscope 104. The configuration shown in FIG. 3 is of Zerni Turner placement type wherein collimating of incident light incoming from an entrance slit 13 and focusing of emission light from a diffraction grating 12 are performed using two separate concave mirrors 10 and 11 and an image is formed on an exit slit 14. The configuration shown in FIG. 4 is of Littrow placement type wherein collimating of incident light incoming from an entrance and exit slit 16 and focusing of emission light outgoing from the entrance and exit slit 16 are performed with one concave mirror 15. The configurations will be discussed in detail.

In the spectroscope of the Zerni Turner placement type shown in FIG. 3, measured light incident through the entrance slit 13 is converted into collimated light on the concave mirror 10, then is made incident on the diffraction grating 12. A spectrum scattered on the diffraction grating 12 is focused by the concave mirror 11, then is formed in the scatter direction on the exit slit 14. According to such a placement, the angle of the diffraction grating 12 can be varied by the motor, etc., whereby the spectrum formed at the center of the exit slit 14 can be varied.

In the Zerni Turner placement, the relation in the following expression exists between the angle of the diffraction grating 12 and the wavelength of the spectrum formed at the center of the exit slit 14:

$$\lambda = \frac{2 \cdot d}{m} \cos a \cdot \sin\theta \qquad (1)$$

where λ is the wavelength of the spectrum, d is the spacing between grooves of the diffraction grating 12, m is the order of diffraction, a is the angle which a bisector ⑤ the angle between incident light on the diffraction grating 12 and emission light therefrom forms with the incident light and emission light, and θ is the angle between the bisector ⑤ and a normal ④ to the diffraction grating 12.

On the other hand, in the spectroscope of the Littrow placement type shown in FIG. 4, the angle a in the Zerni Turner placement shown in FIG. 3 is set to 0 degrees and the concave mirror 15 is used as both the concave mirrors 10 and 11, whereby the relation between the angle of the diffraction grating 12 and the wavelength of the spectrum is obtained. That is, in this case, 0 may be assigned to the angle a in the above-described expression (1).

On the other hand, generally the Zerni Turner placement type or the Littrow placement type is also adopted for placement of the spectral element 119 installed in the wavelength variable light source 101, and the signal light output wavelength relative to the angle of the spectral element 119 can be obtained from the expression (1).

By the way, the actual spectral element of the diffraction grating 12, etc., is configured so that a motor is connected to a speed reduction mechanism having gears in combination to enable finer setting than the intrinsic resolution of the motor. The motor 106 Installed in the optical spectrum analyzer 100 and the motor 120 installed in the wavelength variable light source 101 are also similar to it. Generally, a stepping motor, a servomotor, a direct motor, etc., is used and is controlled with a pulse signal, as described above.

Now, assuming that the spectral element has a speed reduction element proportional to motor rotation, as the relation between the angle of the diffraction grating 12 and the wavelength of the spectrum as shown in expression (1), the following expression is obtained by representing the angle θ of the diffraction grating 12 as the number of drive pulses for controlling the motor rotation quantity:

$$\lambda = \frac{2 \cdot d}{m} \cos a \cdot \sin(\Delta\theta \cdot N_1) \qquad (2)$$

where Δθ is a constant represented by the reduction ratio based on the motor resolution and gear and N1 is the number of pulses for driving the motor.

Figure 5:
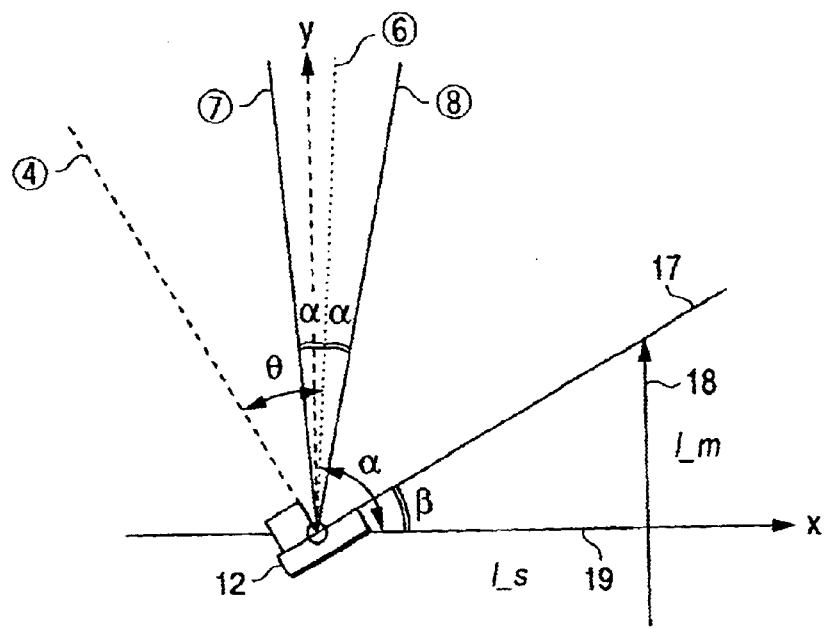
FIG. 5 is a schematic representation to show an example of a speed reduction mechanism of a spectral element using a sine bar technique (angle variable technique) in the first embodiment of the invention.

As the speed reduction mechanism, a mechanism using a sine bar technique as shown in FIG. 5 is also used. The speed reduction mechanism shown in the figure comprises a rotation arm 17, a move arm 18 which becomes a sine of the rotation arm 17, and a fixed arm 19 which becomes a cosine of the rotation arm 17. However, he configuration shown in FIG. 5 is most typical and the invention is not limited to the configuration, of course. In the structure in the figure, the rotation arm 17 is connected to the diffraction grating 12 and the angle between the rotation arm 17 and the fixed arm 19 is varied with one end of the fixed arm 19 as a fulcrum. The fixed arm 19 has a constant length of l_s and becomes the fulcrum of angle change.

The move arm 18 has a length of l_m, the length is varied based on one end of the fixed arm 19, and the rotation arm 17 is pushed, whereby the angle between the rotation arm 17 and the fixed arm 19, β, is varied for determining the angle of the diffraction grating 12. In addition, numeral ④ denotes a normal to the diffraction grating 12, numeral ⑥ denotes a bisector of the angle between incident light on the diffraction grating 12 and emission light therefrom, numeral ⑦ denotes incident light on the diffraction grating 12, numeral ⑧ denotes emission light from the diffraction grating 12, angle α is the angle between the bisector ⑥ and the fixed arm 19 when the plane of the diffraction grating 12 is placed at the fulcrum of the fixed arm 19, and angle θ is the angle between the normal ④ and the bisector ⑥.

Now, considering a simple speed reduction mechanism using gear, a linear proportional relationship exists between the rotation quantity of the motor and the rotation quantity of the reduced spectral element. Thus, the number of pulses for driving the motor, N1, and the diffraction grating angle θ is also linearly proportional to each other. In contrast, in the speed reduction mechanism using the sine bar technique shown in FIG. 5, the length of the move arm 18 is changed by the motor for changing the angle β between the rotation arm 17 and the Fixed arm 19 of a right-angled triangle made up of the rotation arm 17, the move arm 18, and the fixed arm 19. Thus, if the relationship between the rotation quantity of the motor and length change of the move arm 18 is a linearly proportional relationship, it is made possible to change the angle β between the rotation arm 17 and the fixed arm 19 of the right-angled triangle relative to the rotation quantity of the motor in proportion to an inverse trigonometric function.

That is, in the example shown in FIG. 5, the sine length of the right-angled triangle, l_m, is varied while the cosine length of the right-angled triangle, l_s, is fixed. Thus, the angle β is found as an inverse function of sine with respect to the length of the move arm 18, l_m, as shown in the following expression:

$$\beta = \tan^{-1}\left(\frac{l\_m}{l\_s}\right) \quad (3)$$

Therefore, when the angle of the diffraction grating 12 is changed using the speed reduction mechanism using the sine bar technique, spectrum wavelength λ relative to the angle of the diffraction grating 12 or the length of the move arm 18, l_m, is obtained as the relation in the following expression:

$$\lambda = \frac{2 \cdot d}{m} \cos a \cdot \cos(\alpha + \beta) \quad (4)$$

$$= \frac{2 \cdot d}{m} \cos a \cdot \cos\left[\alpha + \tan^{-1}\left(\frac{l\_m}{l\_s}\right)\right]$$

To change the length of the move arm 18, l_m, by the motor, it is made possible to represent the relationship between the angle of the diffraction grating 12 and the spectrum wavelength as shown in expression (4) by the number of pulses for controlling the rotation quantity of the motor as in the following expression:

$$\lambda = \frac{2 \cdot d}{m} \cos a \cdot \cos[\alpha + \tan^{-1}(\Delta l \cdot N_2)]\left[\Delta l = \left(\frac{\Delta l\_m}{l\_s}\right)\right] \quad (5)$$

where Δl_m is a constant represented by the motor resolution and the move arm 18 change amount, Δl is a constant provided as the ratio between Δl_m and the length of the fixed arm 19, and N2 is the number of pulses for controlling the moor.

Now, if the spectroscope 104 contained in the optical spectrum analyzer 100 have the same conditions of optical placement, the diffraction order m, the diffraction grating groove spacing d, and the angle a determined by the angle between the incident light ⑦ and the emission light ⑧ as the spectral element 119 contained in the wavelength variable light source 101, the extracted wavelength of the optical spectrum analyzer 100 and the signal light wavelength output by the wavelength variable light source 101 match in any wavelength and sweep wavelength ranges. Therefore, the diffraction grating 12 installed in the spectroscope 104l and the spectral element 119 installed in the wavelength variable light source 101 are rotated at the same time and at the same rotation speed, whereby their wavelengths can be matched with each other.

However, generally often the optical placement of the spectroscope 104 and the specifications of the diffraction grating do not match the optical placement or the spectral element 119 and the specifications of the diffraction grating. If the spectral element 119 is rotated by a speed reduction mechanism using a sine bar technique to cancel mode hop in the wavelength variable light source 101, both also differ in specifications. As seen from expression (2), the sine function of the number of motor rotation pulses, N1, and the wavelength λ are in a proportional relationship. Thus, if the parameters of the diffraction grating groove spacing d, the angle a, etc., vary, the number of motor rotation pulses, N1, varies in proportion to the inverse sine function of the wavelength λ.

Figure 6:
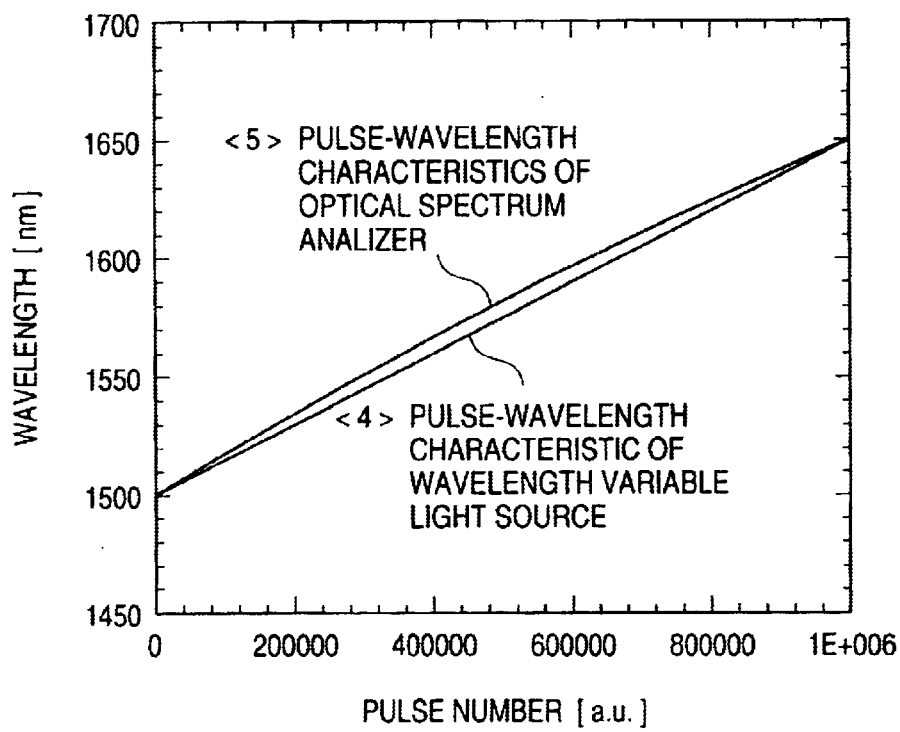
FIG. 6 is a schematic representation to show the wavelength differences occurring between the extracted wavelength of the optical spectrum analyzer and the output signal light wavelength of the wavelength variable light source depending on the optical placement and the characteristic of the spectral element in the first embodiment of the invention.

FIG. 6 shows the wavelength differences between the extracted wavelength of the optical spectrum analyzer 100 and the output signal light wavelength of the wavelength variable light source 101. In the figure, the horizontal axis is the number of pulses for controlling the motor rotation quantity (in arbitrary units) and the vertical axis is the spectrum wavelength (in nanometer units) as in the accompanying drawings that follow. FIG. 6 shows the wavelength characteristics normalized based on the number of motor rotation pulses when the diffraction grating 12 contained in the spectroscope 104 and the spectral element 119 differ in characteristic; <4> indicates the pulse-wavelength characteristic concerning the wavelength variable light source 101 and <5> indicates the pulse-wavelength characteristic concerning the optical spectrum analyzer 100.

Figure 7:
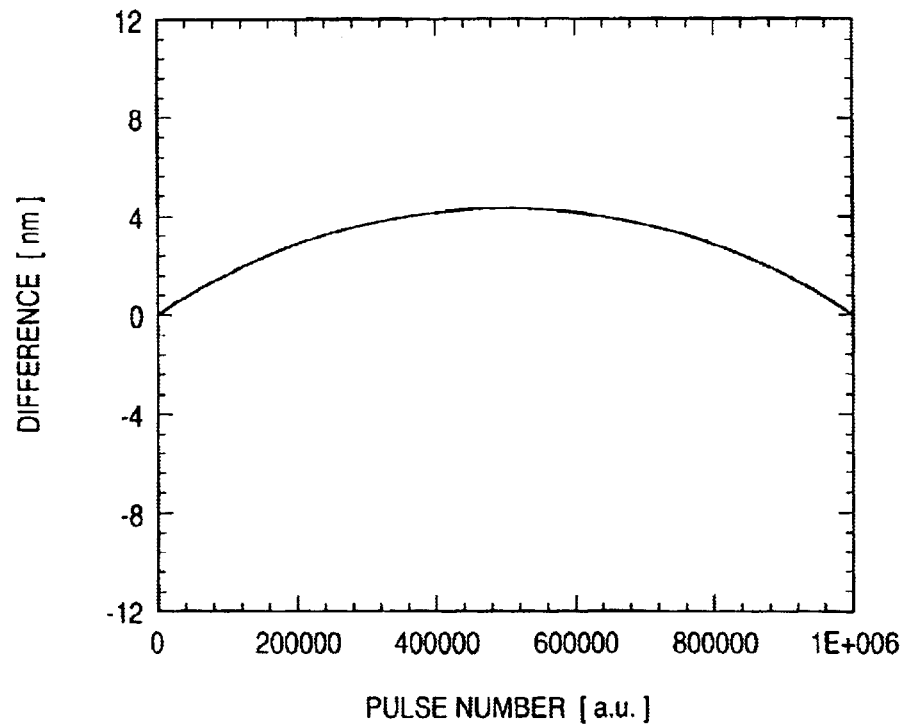
FIG. 7 is a schematic representation to show the wavelength difference quantities occurring between the extracted wavelength of the optical spectrum analyzer and the output signal light wavelength of the wavelength variable light source depending on the optical placement and the characteristic of the spectral element in the first embodiment of the invention.
Figure 8:
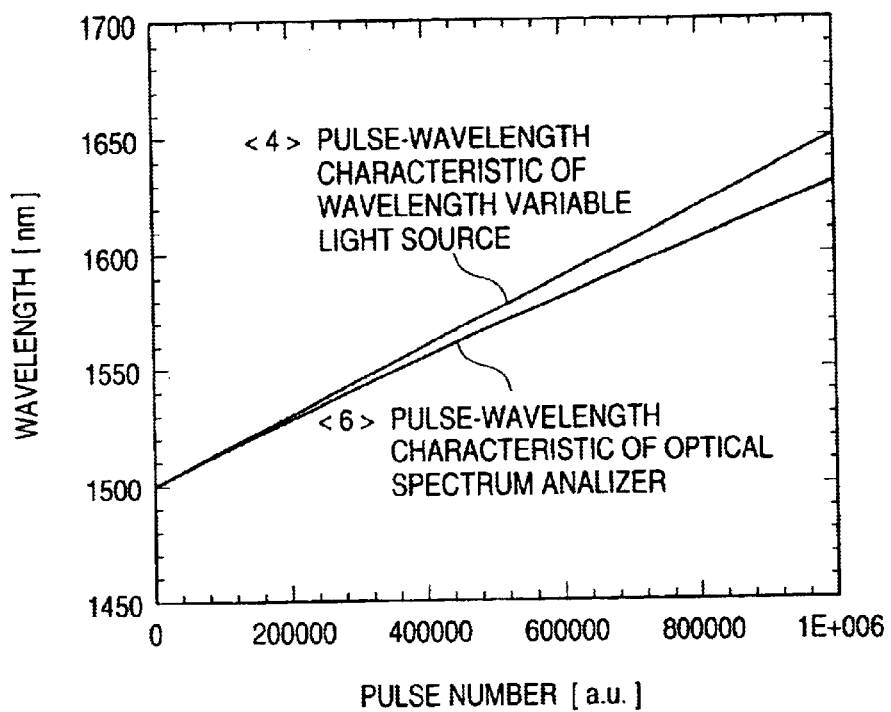
FIG. 8 is a drawing to show the wavelength differences occurring between the extracted wavelength of the optical spectrum analyzer and the output signal light wavelength of the wavelength variable light source depending on the optical placement and the characteristic of the spectral element and is a schematic representation to show the wavelength characteristic relative to the number of motor rotation pulses when normalized based on the wavelength change amount at the sweep start point in the first embodiment of the invention.
Figure 9:
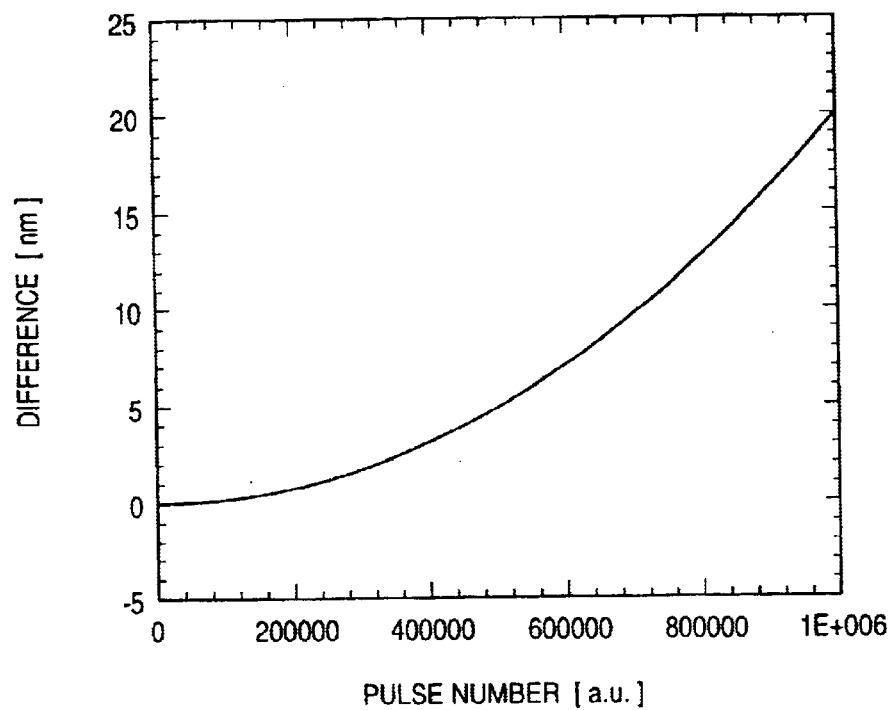
FIG. 9 is a drawing to show the wavelength difference quantities occurring between the extracted wavelength of the optical spectrum analyzer and the output signal light wavelength of the wavelength variable light source depending on the optical placement and the characteristic of the spectral element and is a schematic representation to show the wavelength difference quantities between both characteristics shown in FIG. 8 in the first embodiment of the invention.

FIG. 7 shows the wavelength difference quantities between the characteristics in <4> and <5> shown in FIG. 6, and the vertical axis is the wavelength difference (in nanometer units) On the other hand, FIG. 8 shows the wavelength characteristic relative to the number of motor rotation pulses when normalized based on the wavelength change amount at the sweep start point (namely, the wavelength is about 1500 nm). In the figure, the characteristic indicated by <4> is similar to that in FIG. 6; on the other hand, the characteristic indicated by <6> is the pulse-wavelength characteristic concerning the optical spectrum analyzer 100. FIG. 9 shows the wavelength difference quantities between the characteristics in <4> and <6> shown in FIG. 8. The optical placement of the spectroscope 104 in each of the figures is the Littrow placement.

As shown in FIGS. 7 and 9, the wavelength difference caused by the characteristic difference between the diffraction grating 12 installed in the spectroscope 104 and the spectral element 119 does not change at a constant ratio relative to the number of motor rotation pulses. Thus, even if the motor 106 installed in the optical spectrum analyzer 100 and the motor 120 installed in the wavelength variable light source 101 are simply rotated at uniform rate at different motor rotation speeds, the extracted wavelength of the optical spectrum analyzer 100 and the output signal light wavelength of the wavelength variable light source 101 cannot be matched with each other.

Thus, in the embodiment, first, for a characteristic function similar to expressions (2) or (5) determined by the optical placement of the spectroscope 104l and the characteristic of the diffraction grating 12 and a characteristic function determined by the optical placement of the wavelength variable light source 101 and the characteristic of the spectral element 119, such an inverse function to find the number of motor rotation pulses with the wavelength as a variable is derived from each of the characteristic functions. Next, the rotation speed of the motor 106 is found from the difference between the numbers of motor rotation pulses obtained from the two inverse functions for the wavelengths in the sweep wavelength range to perform wavelength tracking with the wavelength variable light source 101 for actually outputting signal light as the reference.

Figure 10:
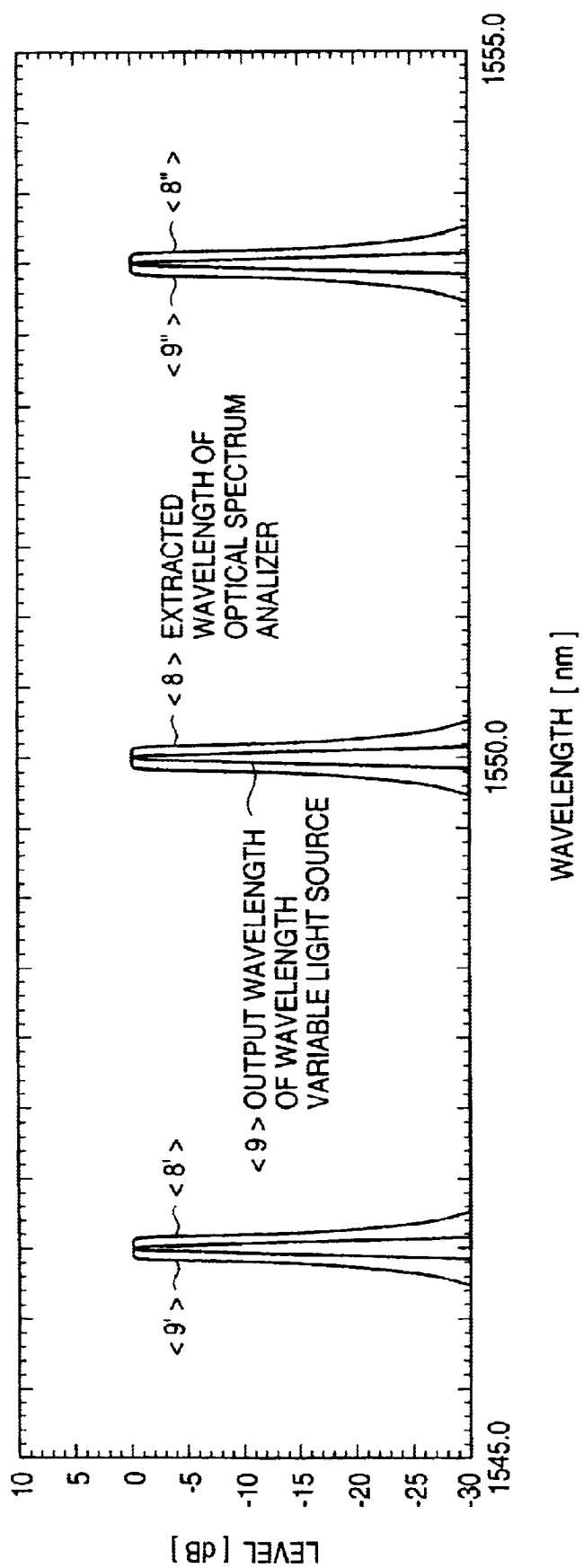
FIG. 10 is a schematic representation to show the relationship between the extracted wavelength of the optical spectrum analyzer and the output signal light wavelength of the wavelength variable light source when wavelength tracking according to the first embodiment of the invention is executed.

To rotate the motors 106 and 120 continuously at high speed from the sweep start wavelength to the sweep end wavelength, first a motor rotation start synchronizing signal A is used to synchronize both the motors with each other to start them at the same time. Next, as shown in FIG. 10, sweep is performed while the rotation speed of the motor 106 is changed so that the extracted wavelength of the spectroscope 104 installed in the optical spectrum analyzer 100 (<8> in the figure) and the signal light wavelength output by the wavelength variable light source 101 (<9> in the figure) always match. For example, in <8> and <9>, <8'> and <9'>, and <8"> and <9"> in FIG. 10, the center wavelengths match. The vertical axis in FIG. 10 is decibel indication with the maximum light levels of the extracted light of the optical spectrum analyzer 100 and the output light of the wavelength variable light source 101 as 0 decibels as in the accompanying drawings that follow.

FIG. 2 previously given shows motor rotation speed change in the embodiment. In the figure, on the vertical axis, the motor rotation speed is indicated by the pulse rate (pulses per second) The characteristic shown in <1> indicates the rotation speed relative to each wavelength of the motor 120 installed in the wavelength variable light source 101. The characteristic shown in <2> indicates the rotation speed relative to each wavelength of the motor 106 when normalization is executed at the sweep start wavelength (about 1500 nm) and the sweep end wavelength (about 1650 nm) for the optical spectrum analyzer 100 and the wavelength variable light source 101 and the signal light wavelength output by the wavelength variable light source 101 and the extracted wavelength of the optical spectrum analyzer 100 are matched with each other. On the other hand, the characteristic shown in <3> indicates the rotation speed relative to each wavelength of the motor 106 when normalization of the optical spectrum analyzer 100 and the wavelength variable light source 101 is executed only at the sweep start wavelength and the signal light wavelength output by the wavelength variable light source 101 and the extracted wavelength of the optical spectrum analyzer 100 are matched with each other.

The spectroscope 104 in the embodiment adopts a single pass method of once applying light to the diffraction grating 12 of the spectral element according to the configuration shown in FIG. 3 or 4. However, the invention is not limited to it and can also be applied to any configuration adopting a double method, a double pass method, or any other method, needless to say.

The operation of the described wavelength characteristic measurement apparatus is as follows: In the description to follow, the case of using the motor speed characteristics normalized at both the sweep start wavelength and the sweep end wavelength as shown in <1> and <2> in FIG. 2 is taken as an example, but similar operation is performed if any other motor rotation speed characteristic is applied. In the description to follow, the case wherein the drive circuit 107 serves as a master and the drive circuit 125 serves as a slave is taken as an example.

First, to specify the sweep range, the measurer sets the measurement conditions of the measurement start wavelength, the measurement end wavelength, the number of measurement samples, etc., in the optical spectrum analyzer 100. Then, the control section 102 finds the data of the measurement wavelength intervals, etc., in accordance with the setup measurement conditions, then sets the rotation speed characteristic of the motor 106 shown in <2> in FIG. 2 in the drive circuit 107. That is, the control section 102 derives a correction function of the rotation speed of the motor 106 based on the characteristic function proper to the spectroscope 104 installed in the optical spectrum analyzer 100 and the characteristic function proper to the wavelength variable light source 101, and sets the correction function in the drive circuit 107. Then, the drive circuit 107 performs rotation speed control of the motor 106 in accordance with the setup correction function.

Next, the control section 102 transmits the setup measurement conditions to the control section 111 through the communication circuit 103, the terminals ③ and ③', and the communication circuit 116, which will be hereinafter referred to as communication interface. Like the control section 102, the control section 115 finds the measurement wavelength intervals, etc., in accordance with the transmitted measurement conditions, and sets the rotation speed characteristic of the motor 120 shown in <1> in FIG. 2 in the drive circuit 125. The control section 115 also controls the light source drive circuit 123 based on preset light source drive information, thereby driving the laser element 117 to laser.

Next, the drive circuit 107 outputs a motor drive signal to the motor 106 so that the extracted wavelength of the spectroscope 104 becomes the sweep start wavelength provided by adding a section required for accelerating the motor 106 to the preset measurement start wavelength in accordance with a control signal from the control section 102. Then, as the motor 106 is rotated, the diffraction grating 12 placed in the spectroscope 104 is rotated to the angle corresponding to the sweep start wavelength. At this time, the control section checks to see if the rotation quantity of the motor 106 reaches the value corresponding to the sweep start wavelength based on the output result from the position detection circuit 108 connected to the motor 106. At the same time, the control section 102 transmits an instruction for setting the angle of the spectral element 119 so that the output wavelength from the laser element 117 becomes the sweep start wavelength provided by adding a section required for accelerating the motor 120 to the measurement start wavelength to the control section 115 through the communication interface. Then, the control section 115 sets the drive circuit 125 for driving the motor 120 and also checks to see if the rotation quantity of the motor 120 reaches the value corresponding to the sweep start wavelength based on the output of the position detection circuit 121 connected to the motor 120.

Then, when the measurer gives a measurement start command, the control section 102 starts the drive circuit 107 for outputting a drive signal of the motor 106 and sets the target wavelength in the position detection circuit 108. The drive circuit 107 outputs a motor rotation start synchronizing signal A to the terminal ① and at the same time, accelerates the motor 106. At this time, upon reception of the motor rotation start synchronizing signal A through the terminal ①', the drive circuit 125 starts outputting a drive signal to the motor 120 for accelerating the motor 120 in synchronization with the motor rotation start synchronizing signal A. Upon completion of the acceleration operation, immediately the control circuit 107 drives the motor 106 until the measurement end wavelength is reached while varying the rotation speed of the motor 106 in accordance with the preset correction function, then performs the deceleration operation and stops the motor 106 at the rotation quantity corresponding to the sweep end wavelength. Likewise, after completion of the acceleration operation, the drive circuit 125 drives the motor 120 at uniform rate until the rotation angle of the spectral element 119 reaches the measurement end wavelength, then performs the deceleration operation and stops the spectral element 119 at the rotation speed corresponding to the sweep end wavelength. Here, a section required for acceleration and the acceleration rate are set so that the time between starting one motor and reaching the measurement start wavelength becomes the same as the time between starting the other motor and reaching the measurement start wavelength. To start each motor from the measurement start wavelength and the measurement end wavelength without setting the sweep start wavelength or the sweep end wavelength, it is necessary to consider a section required for deceleration and the deceleration rate in addition to the section required for acceleration and the acceleration rate.

As described above, the control section 102 starts the drive circuit 107 for outputting a drive signal of the motor 106 and sets the target wavelength in the position detection circuit 108. Peahen the rotation quantity of the motor 106 reaches the rotation quantity corresponding to the target wavelength, the position detection circuit 108 outputs a trigger pulse to the change/delay circuit 109. Likewise, the control section 115 starts the drive circuit 125 for outputting a drive signal of the motor 120 and sets the target wavelength in the position detection circuit 121. When the rotation quantity of the motor 120 reaches the rotation quantity corresponding to the target wavelength, the position detection circuit 121 outputs a sampling timing signal B to the control section 115 and the terminal ②'. The sampling timing signal B is sent through the terminal ② of the optical spectrum analyzer 100 to the change/delay circuit 109. The change/delay circuit 109 waits for the trigger pulse and the sampling timing signal B to be sent. When both the extracted wavelength of the spectroscope 104 and the oscillation wavelength of the laser element 117 reach the target wavelength, a trigger pulse is output from the position detection circuit 108 and a sampling timing signal B is output from the position detection circuit 121. Then, when the trigger pulse and the sampling timing signal B are input at the same timing, the change/delay circuit 109 assumes that the wavelengths match, and sends the sampling timing signal to the A/D converter 112 and the control section 102 after the expiration of the delay time set from the control section 102. Upon reception of the sampling timing signal, the control section 102 sets the next target wavelength previously found in the position detection circuit 108. On the other hand, the control circuit 115 sets the next target wavelength in the position detection circuit 121 upon reception of the sampling timing signal B.

The starting method of the A/D converter 112 is not limited to the method described above. For example, in the embodiment, the extracted wavelength of the spectroscope 104 and the oscillation wavelength output by the laser element 117 match, thus the change/delay circuit 109 is set so as to select only the trigger pulse output from the position detection circuit 108 placed in the optical spectrum analyzer 100, and the A/D converter 112 may be started based only on the trigger pulse. The A/D converter 112 may be started based only on the sampling timing signal B sent from the position detection circuit 121 placed in the wavelength variable light source 101 to the change/delay circuit 109. In addition, in second and third embodiments described later, the wavelength of single mode signal light output from a laser element 117 installed in a wavelength variable light source 101 is used as the reference, thus it is desirable to start an A/D converter 112 based on a sampling timing signal B from a position detection circuit 121 connected to a motor 120 or driving a spectral element 119 for determining the oscillation wavelength of signal light output from the laser element 117.

Then, similar operation to that described above is performed for each measurement wavelength interval over all sweep wavelength range to the measurement end wavelength and the data at the measurement end wavelength is obtained, and then the measurement is terminated. That is, the drive circuits 107 and 125 rotate the motors 106 and 120 continuously so as to provide the motor rotation speed characteristics shown in FIG. 2 in accordance with the motor control conditions and the pulse rate correction function preset by the control section 102, thereby matching the extracted wavelength of the spectroscope 104 and the output wavelength of the wavelength variable light source 101 with each other over all range of the sweep wavelengths. The target wavelength is set in either or both of the position detection circuits 109 and 121 connected to the motors 106 and 120 and when the wavelengths match, the A/D converter 112 is started, thereby performing sampling, and a light power value is found by performing operation and is plotted on the display section 113. This operation sequence is performed for each measurement wavelength interval throughout the setup sweep wavelength range, whereby the wavelength characteristic of the measured object 114 is measured and is displayed on the display section 113.

Thus, in the embodiment, when the rotation speeds of the motors 106 and 120 reach each wavelength to perform sampling while the motors 106 and 120 are rotated continuously, the A/D converter 112 is started and measurement data is acquired. In the embodiment, single mode signal light output from the wavelength variable light source 101 becomes the probe of the measured object 114, so that the A/D converter 112 of the optical spectrum analyzer 100 can be started by the sampling timing signal B output by the position detection circuit 121 installed in the wavelength variable light source 101. Thus, in the related art, the motors 106 and 120 are stopped for each measurement wavelength interval and the A/D converter 112 is started, so that it takes much time, but such a problem does not arise in the embodiment.

Figure 11:
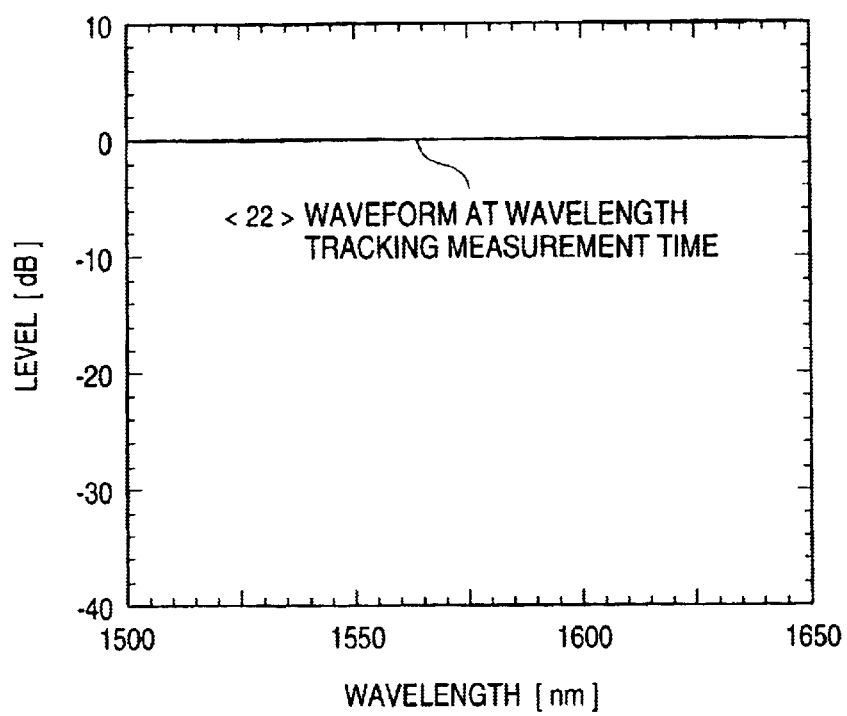
FIG. 11 is a schematic representation to show the measurement waveform provided by performing measurement with the optical spectrum analyzer and the wavelength variable light source connected by an optical fiber cord in the first embodiment of the invention.

Actually, if the optical input terminal 105 installed in the optical spectrum analyzer 100 and the optical output terminal 118 installed in the wavelength variable light source 101 are connected by an optical fiber cord 130 having a flat wavelength characteristic as indicated by the dashed line in FIG. 1 and wavelength tracking measurement is executed, the flat measurement result as shown in <22> in FIG. 11 is provided on the display section 113. In contrast, if wavelength tracking according to the embodiment is not executed, a wavelength difference occurs between the extracted wavelength of the optical spectrum analyzer 100 and the output signal light wavelength of the wavelength variable light source 101. Thus, a loss is increased because of the spectral characteristic of the spectroscope 104 in the optical spectrum analyzer 100 and measurement level variation occurs as the waveform indicated in <23> in FIG. 12, resulting in a measurement error in the wavelength tracking measurement.

Figure 12:
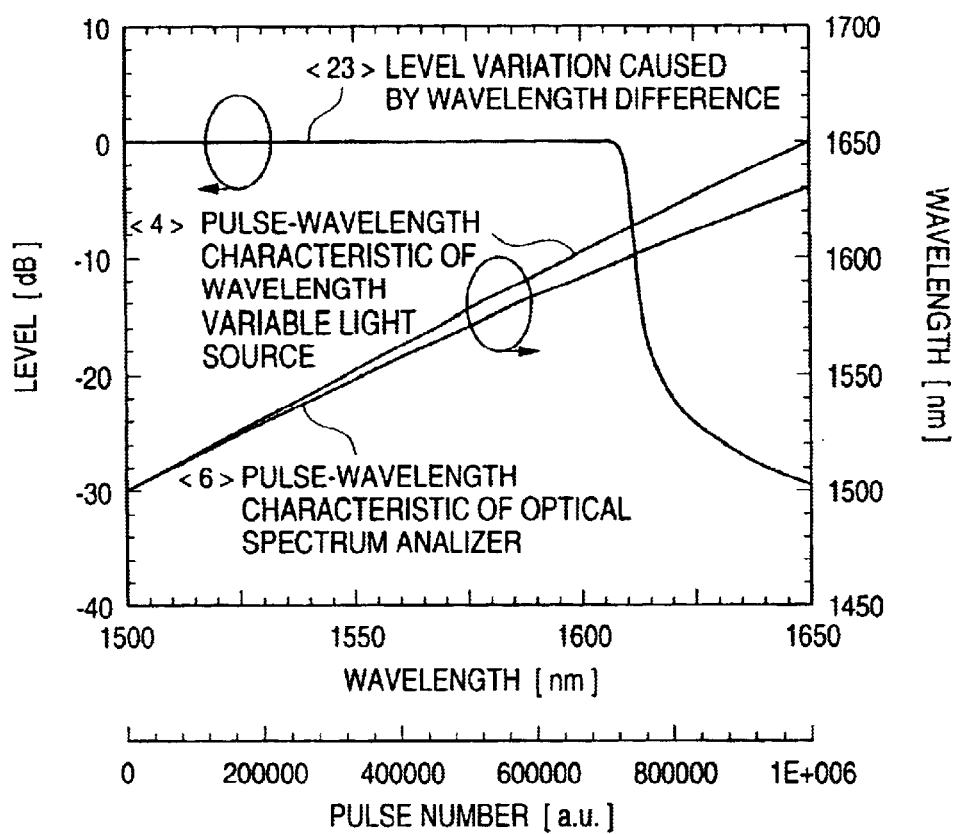
FIG. 12 is a schematic representation to show the pulse-wavelength characteristics concerning the optical spectrum analyzer and the wavelength variable light source and measurement waveform level variation caused by the wavelength difference therebetween when sweep is performed without executing wavelength tracking according to the first embodiment of the invention.
Figure 13:
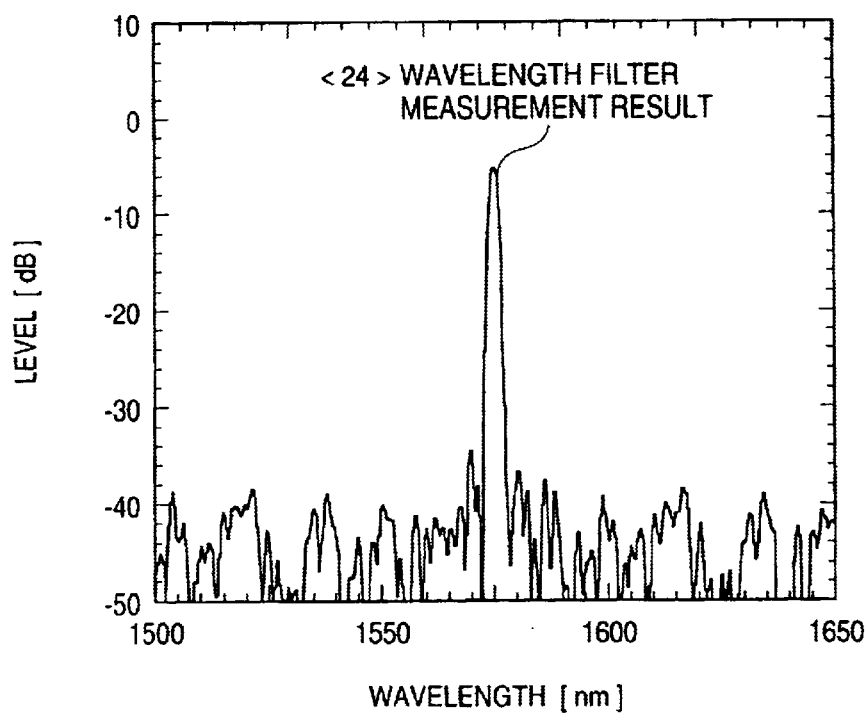
FIG. 13 is a schematic representation to show the measurement result of the transmission wavelength characteristic of a wavelength filter when wavelength tracking measurement according to the first embodiment of the invention is executed.

FIG. 12 shows the same pulse-wavelength characteristics as shown in FIG. 8 (horizontal axis: Number of pulses, vertical axis: Measurement level) and also shows a measurement waveform as in FIG. 11 (horizontal axis: Wavelength, vertical axis: Measurement level). As seen in FIG. 12, as the number of pulses increases, the wavelength difference increases and the measurement level drops abruptly from the flat state from the point where the wavelength becomes larger than about 1610 nm. In addition, the waveform shown in <24> in FIG. 13 is the measurement result with a wavelength filter inserted between the optical input terminal 105 and the optical output terminal 118 to perform wavelength tracking measurement according to the embodiment.

Figure 14:
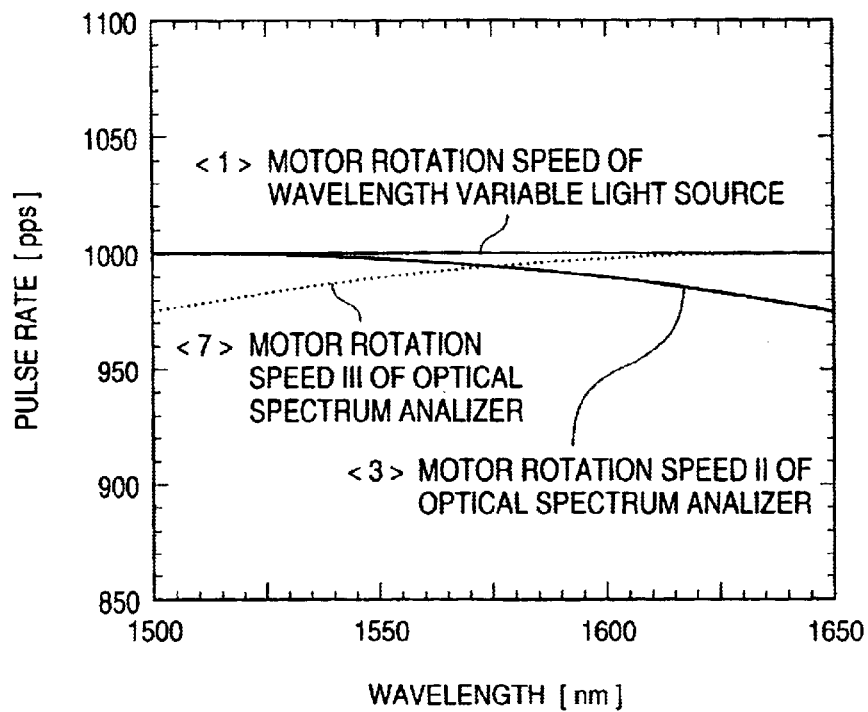
FIG. 14 is a drawing to show change in motor rotation speed for each of the optical spectrum analyzer and the wavelength variable light source in the first embodiment of the invention and is a schematic representation to show the characteristic in normalizing with the wavelength change amount at the sweep start point and the characteristic in normalizing with the wavelength change amount at the sweep end point.

To derive the rotation speed of the motor 106, the method is not limited to normalization with the number of pulses such that the rotation speed of the motor 106 at the sweep start wavelength matches that at the sweep end wavelength as the motor rotation speed characteristic shown in <2> in FIG. 2. That is, a method of deriving the rotation speed by normalizing with the wavelength change amount at the sweep start point as the characteristic shown in <3> in FIG. 2 or a method of deriving the rotation speed by normalizing with the wavelength change amount at the sweep end point as the characteristic shown in <7> in FIG. 14 may be used. The characteristics in <1> and <2> shown in FIG. 14 are the same as those shown in FIG. 2.

The optical placement of the spectroscope 104 is not limited to the Littrow placement and may be the above-described Zerni Turner placement, etc. The speed reduction mechanism is not limited to a mechanism comprising a linear reduction ratio using a gear or a belt and may be the above-described sine bar technique, etc., and further the spectroscope 1011 may be driven directly by the motor without using the speed reduction mechanism in the description, the rotation speed of the motor 106 is derived with the function concerning the wavelength variable light source 101 as the reference, but the invention is not limited to the method. For example, conversely, the rotation speed of the motor 120 installed in the wavelength variable light source 101 may be derived with the function concerning the spectroscope 104 installed in the wavelength variable light source 101 as the reference.

Second Embodiment

In the first embodiment, the correction function of the motor rotation speed is derived based on the characteristic function proper to the spectroscope 104 installed in the optical spectrum analyzer 100 and the characteristic function proper to the wavelength variable light source 101. Motor control is performed in accordance with the derived correction function, whereby the extracted wavelength of the optical spectrum analyzer 100 and the signal light wavelength output from the wavelength variable light source 101 are matched with each other over all wavelength range to perform sweep. Thus, to realize the first embodiment, the drive circuit for controlling the motor (either the drive circuit 107 or 125 in FIG. 1) needs to comprise the motor rotation speed control function in accordance with the correction function.

However, a general motor drive circuit comprises an acceleration control function at the motor start time and a deceleration control function at the motor stop time; it rarely has a complicated motor rotation speed control function in a stationary operation area and normally can perform only uniform rate rotation control. Thus, a second embodiment of the invention is intended for providing wavelength tracking control with a general motor drive circuit only. Therefore, the configuration of a wavelength characteristic measurement apparatus of the second embodiment basically is similar to that of the first embodiment; they differ in use of general motor drive circuits as drive circuits 107 and 125 and in the following point.

In the second embodiment, the spectrum width of output signal light of a laser element 117 is a narrow band of several kHz to several MHz. The extracted wavelength characteristic of a spectroscope 104 is determined by the spectral characteristic determined by the characteristic and specific optical placement of the diffraction grating shown in FIG. 3, focal distances of the concave mirrors 10 and 11 in FIG. 3, the widths of the entrance slit 13 and the exit slit 14 in FIG. 3, etc. Normally, for the spectral characteristic of the spectroscope 104, the spectral band width of the spectroscope 104 can be varied, for example, by varying the widths of the entrance slit 13 and the exit slit 14, and the profile changes depending on the relationship between the image formation form on the slit determined by the performance of the concave mirrors 10 and 11 and the slit widths.

Figure 15:
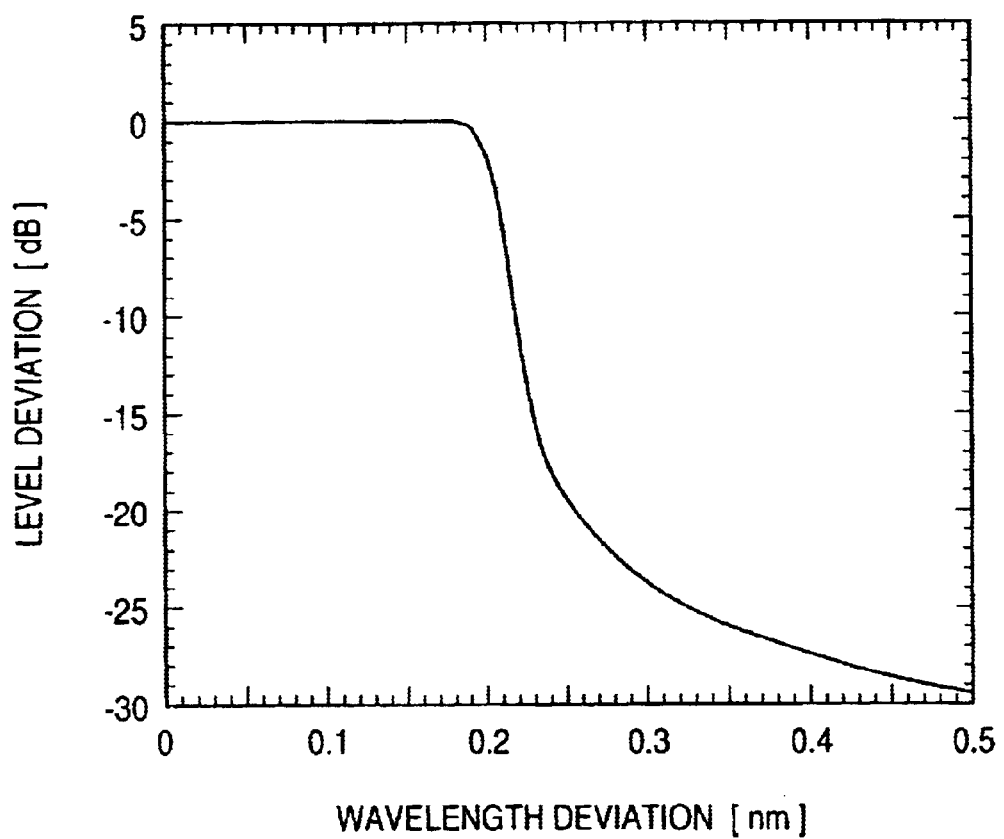
FIG. 15 is a schematic representation to show the measurement level variation characteristic caused by the wavelength difference between the extracted wavelength of optical spectrum analyzer and the output signal light wavelength of wavelength variable light source, determined by the spectral characteristic of spectroscope installed in the optical spectrum analyzer in a second embodiment of the invention.

Now, if the entrance slit 13 and the exit slit 14 are set to the widths sufficiently wider than the image formation form, the spectral characteristic of the spectroscope 104 is a characteristic wherein the maximum transmission quantities are flat over a specific wavelength range in the wavelength areas preceding and following the setup extracted wavelength as the center as shown in <8>, <8'>, and <8"> in FIG. 10. Thus, as shown in FIG. 15, as seen from measurement level change relative to the wavelength difference between the extracted wavelength of optical spectrum analyzer 100 and the output signal light wavelength of wavelength variable light source 101, if the wavelength of single mode signal light in the narrow band changes in the flat wavelength area in the spectral characteristic, the strength of incident signal light on a photodetector 110 extracted by the spectroscope 104 does not change.

Then, in the embodiment, in the sweep wavelength range set by the measurer to perform wavelength tracking, the wavelength difference between the extracted wavelength of the optical spectrum analyzer 100 and the output signal light wavelength of the wavelength variable light source 101 (see FIG. 7 or 9) is made to converge in the flat wavelength area in the spectral characteristic of the spectroscope 104. The rotation speed of a motor 106 relative to the rotation speed of a motor 120 is determined and the motors are rotated at constant speed based on the determined rotation speed.

Figure 16:
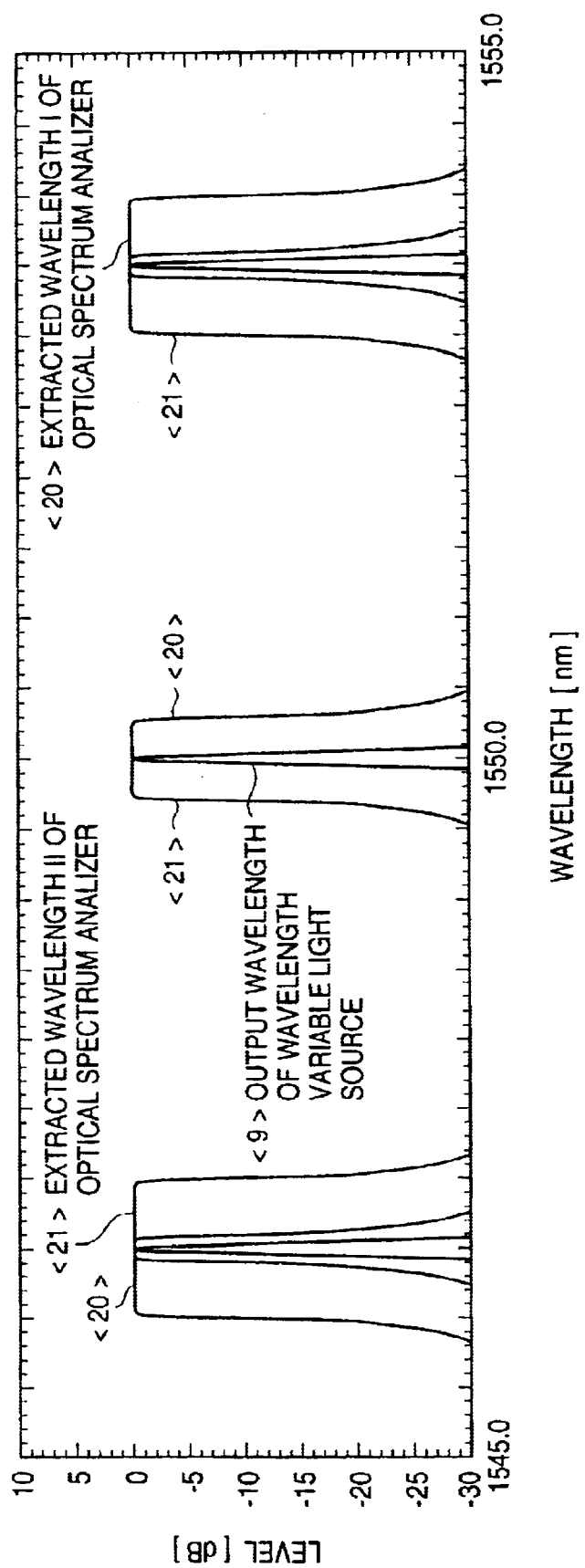
FIG. 16 is a schematic representation to show the relationship between the extracted wavelength of the optical spectrum analyzer and the output signal light wavelength of the wavelength variable light source when wavelength tracking measurement according to the second embodiment of the invention is executed.

Now, assume that the sweep wavelength range is 1546.5 nm to 1553.5 nm and that the center wavelength is 1550 nm, as shown in FIG. 16. Assume that the rotation speed of the motor 106 is determined so that the extracted wavelength determined from the optical placement proper to the spectroscope 104, etc., (<20> or <21> shown in FIG. 16) and the output signal light wavelength of the wavelength variable light source 101 (<9> in the figure) match at the center wavelength of the setup sweep wavelength range.

Then, as shown in FIG. 16, a wavelength difference occurs between the extracted wavelength of the optical spectrum analyzer 100 and the output signal light wavelength of the wavelength variable light source 101 on the short wavelength side and the long wavelength side of the sweep wavelength range. Also in this case, however, the wavelength difference converges in the flat wavelength area in the spectral characteristic of the spectroscope 104, so that the measured optical signal strength does not change. Thus, it is made possible to provide wavelength tracking control simply by performing easy motor rotation speed control.

The operation of the wavelength characteristic measurement apparatus in the embodiment is the same as that in the first embodiment except the following and therefore will not be discussed again in detail: Such a correction made so as to completely match the extracted wavelength of the spectroscope 104 and the output signal light wavelength of the wavelength variable light source 101 with each other throughout the sweep wavelength range as in the first embodiment is not made in the second embodiment. As an alternative way, in the embodiment, control is performed so that the wavelength difference between the extracted wavelength and the output signal light wavelength in the setup sweep wavelength range converges in the wavelength range corresponding to the flat area of the maximum transmission characteristic of the spectroscope 104.

Thus, in the embodiment, the motor rotation quantity required for sweep is found based on the rotation quantity at the initial rotation time of the motor 106 for driving the spectroscope 104 and the rotation quantity at the stop time of the motor and the motor rotation speed is found from the sweep time of the wavelength variable light source 101, then the motors 106 and 120 are rotated at uniform rate in accordance with the motor rotation quantity and the motor rotation speed, thereby tracking the spectroscope 104 and the wavelength variable light source 101. Thus, in the embodiment, the drive circuits 107 and 125 control only the rotation speeds and the rotation quantities of the motors 106 and 120 in the beginning, and control is performed so as to operate the motors at uniform rate during the sweep. In this point, the second embodiment differs from the first embodiment.

Figure 17:
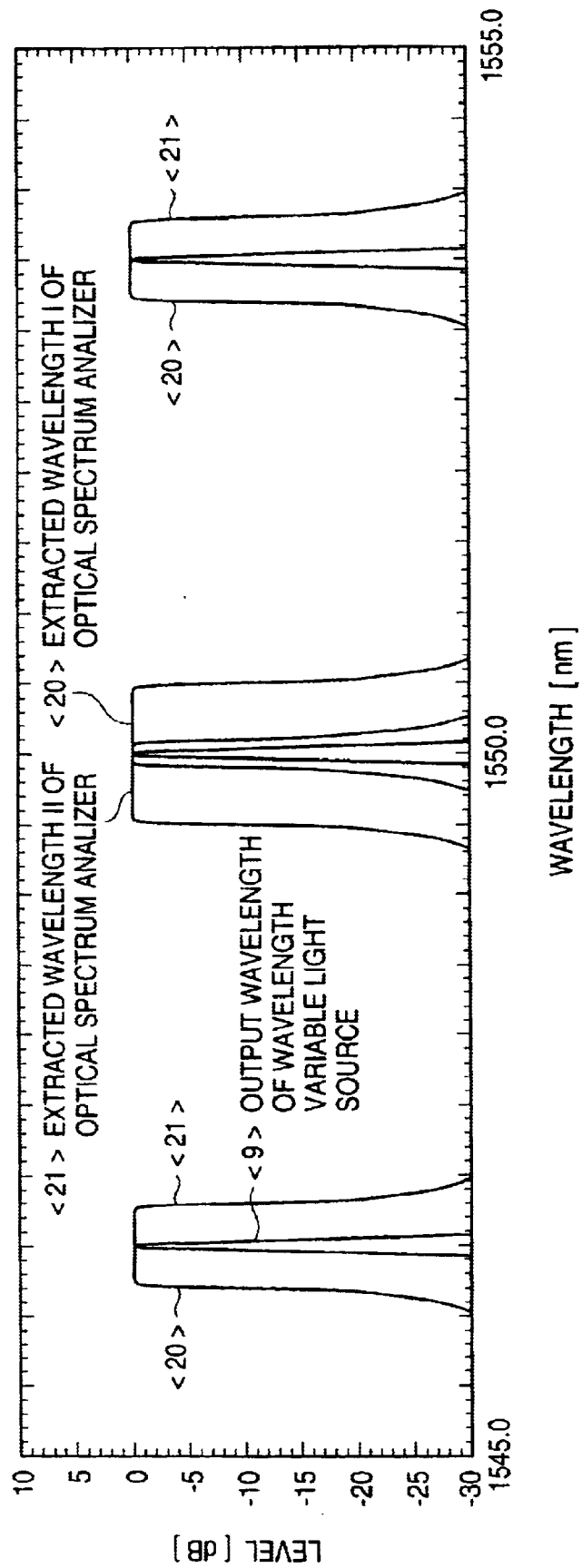
FIG. 17 is a schematic representation to show the relationship between the extracted wavelength of the optical spectrum analyzer and the output signal light wavelength of the wavelength variable light source when wavelength tracking measurement according to the second embodiment of the invention is executed and is a schematic representation to determine motor rotation speed so that the extracted wavelength and the output signal light wavelength match at both the sweep start wavelength and the sweep end wavelength.

The rotation speed of the motor 106 is determined so that the extracted wavelength and the output signal light wavelength match at the center wavelength in the sweep wavelength range, but the invention is not limited to it. For example, the motor rotation speed may be determined so that the extracted wavelength and the output signal light wavelength match at both the sweep start wavelength and the sweep end wavelength as shown in FIG. 17, or at either the sweep start wavelength or the sweep end wavelength, or any other motor rotation speed may be determined.

In the description given above, the motor rotation speed of the motor 106 is found based on the wavelength characteristic relative to the number of rotation pulses of the motor 120, but the invention is not limited to it. For example, conversely, the motor rotation speed of the motor 120 may be found based on the wavelength characteristic relative to the number of rotation pulses of the motor 106.

Third Embodiment

A third embodiment of the invention is a preferred embodiment if the following situation arises in the second embodiment: As the situation, it is possible that the pulse-wavelength characteristic of the spectroscope 104 installed in the optical spectrum analyzer 100 (characteristic in <5> shown in FIG. 6) and the pulse-wavelength characteristic of the wavelength variable light source 101 (characteristic in <4> shown in FIG. 6) differ largely. In addition, it is possible that since the flat wavelength area determined by the spectral characteristic of the spectroscope 104 (see FIG. 10) is narrow, the output signal light wavelength of the wavelength variable light source 101 varies in level exceeding the flat wavelength area of the spectral characteristic determined by the resolution of the spectroscope 104 in the setup sweep wavelength range.

Then, in the third embodiment, a wavelength range or a wavelength section in which the output signal light wavelength of the wavelength variable light source 101 converges in the flat wavelength area of the spectroscope 104 is found, the whole sweep wavelength range is divided according to the found wavelength section, and the optimum value for the rotation speed of the motor 106 for driving the spectroscope 104 is determined for each wavelength section as a division. For each wavelength section as a division, motor control is performed according to the motor rotation speed fitted to the section, so that the output signal light wavelength of the wavelength variable light source 101 is made to converge in the flat wavelength area determined by the spectral characteristic of the spectroscope 104.

Figure 18:
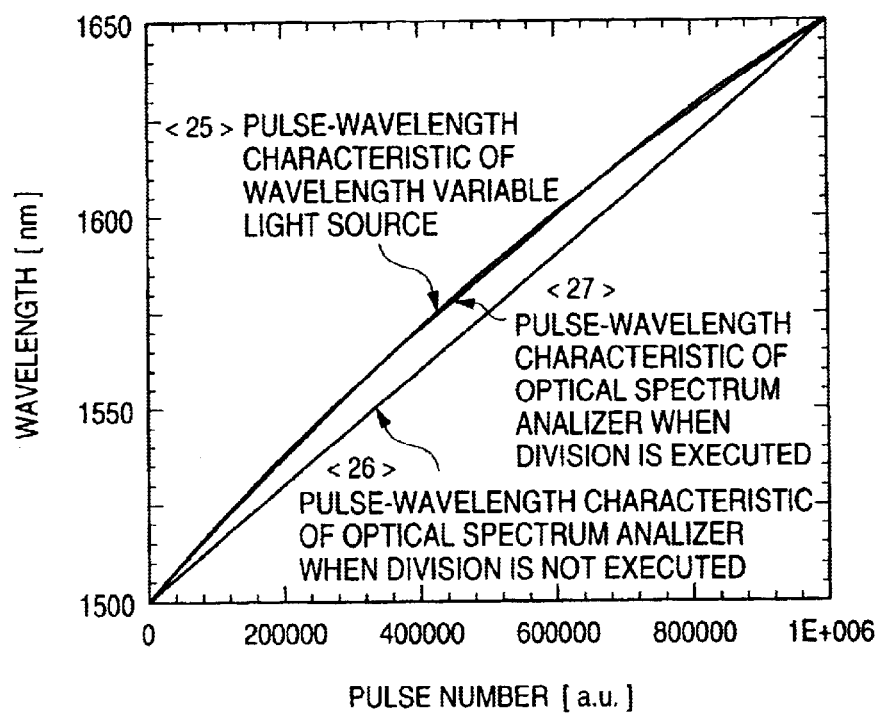
FIG. 18 is a schematic representation to show the relationship between the extracted wavelength of optical spectrum analyzer and the output signal light wavelength of wavelength variable light source when wavelength tracking measurement according to a third embodiment of the invention is executed.

FIG. 18 shows specific examples of the pulse-wavelength characteristics when division is executed (third embodiment) and division is not executed (second embodiment). In the figure, the characteristic shown in <25> is the characteristic of the output signal light wavelength relative to the number of pulses in the wavelength variable light source 101, the characteristic shown in <26> is the characteristic of the extracted wavelength of the optical spectrum analyzer 100 relative to the number of pulses when the second embodiment is applied, and the characteristic shown in <27> is the characteristic of the extracted wavelength relative to the number of pulses for each section as a division when the third embodiment is applied. As compared with the case of applying the second embodiment, the pulse-wavelength characteristic of the optical spectrum analyzer when the third embodiment is applied is close to that of the wavelength variable light source throughout the sweep wavelength range and the wavelength difference therebetween little exists.

Figure 19:
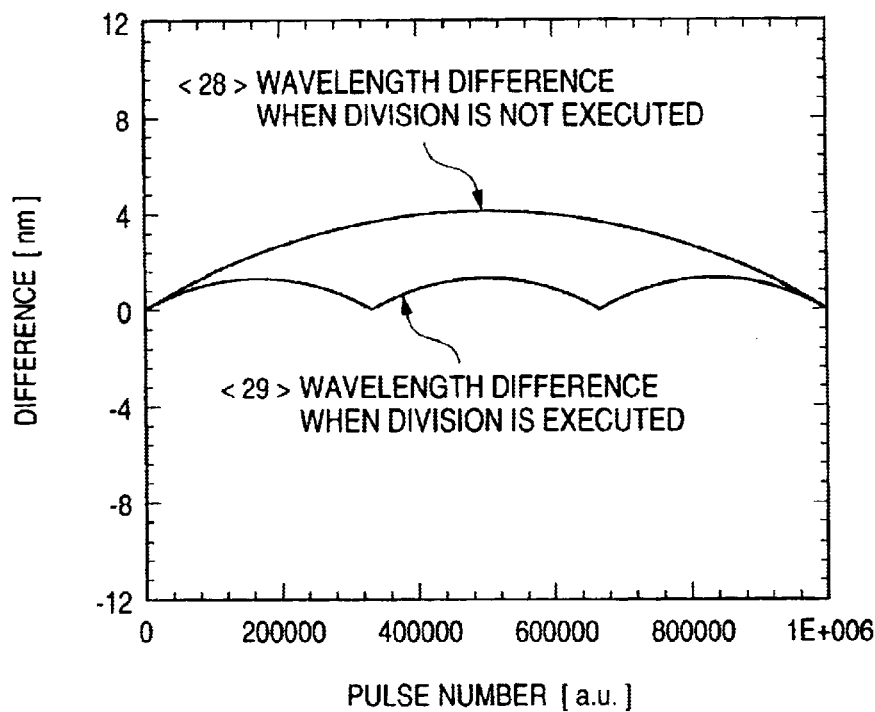
FIG. 19 is a schematic representation to show the amounts of the wavelength difference between the extracted wavelength of the optical spectrum analyzer and the output signal light wavelength of the wavelength variable light source in the third embodiment of the invention wherein division is executed and those when division is not executed.

FIG. 19 shows the wavelength differences in the pulse-wavelength characteristics of the optical spectrum analyzer 100 and the wavelength variable light source 101 shown in FIG. 18. In the figure, the characteristic shown in <28> is the characteristic of the wavelength difference when the second embodiment is applied (division is not executed), and the characteristic shown in <29> is the characteristic of the wavelength difference when the third embodiment is applied. In the example in FIG. 19, the whole sweep wavelength range is divided into three sections of 0 to 32000 pulses or a little more, 32000 pulses or a little more to 680000 pulses or a little less, and 680000 pulses or a little less to 1E+006 (=106) pulses. When the second embodiment is applied, the maximum value of the wavelength difference exceeds 4, [nm]; if the third embodiment is applied, the maximum value of the wavelength difference is reduced to about 1 [nm]. Thus, the output signal light wavelength of the wavelength variable light source 101 is converged in the flat wavelength area determined by the spectral characteristic of the spectroscope 104.

Figure 20:
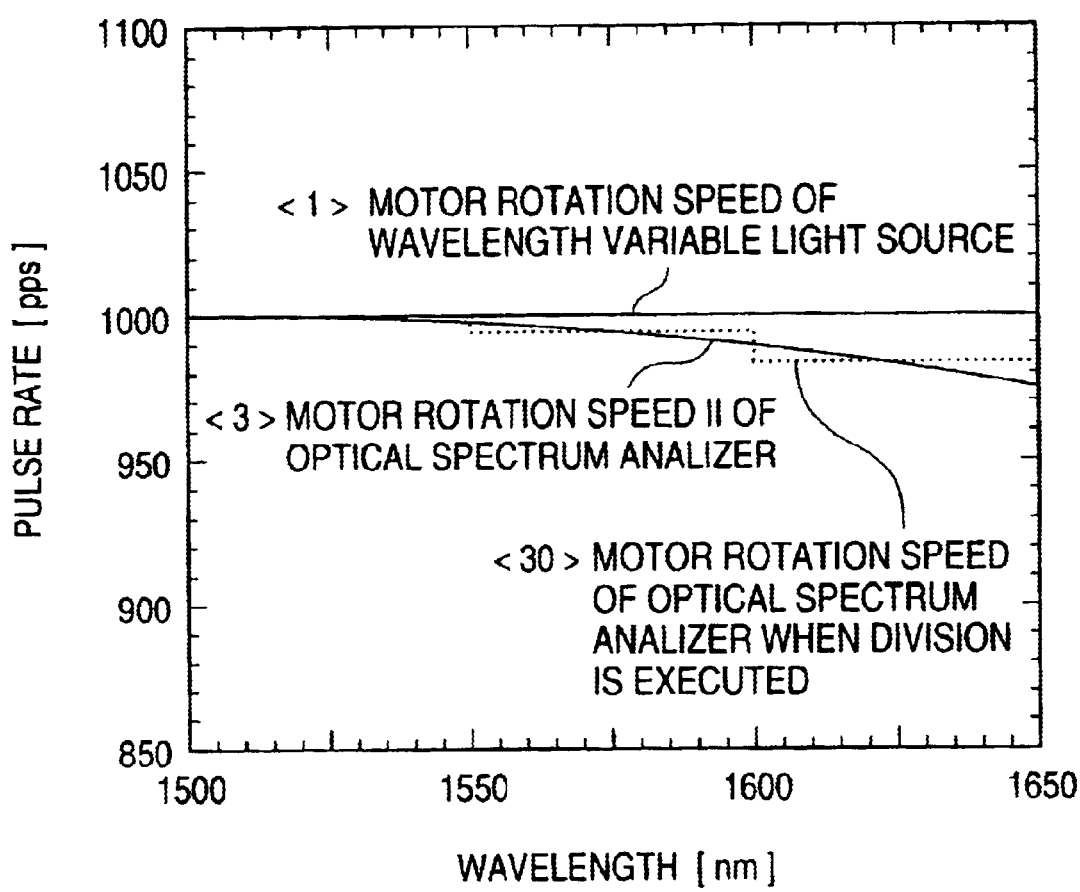
FIG. 20 is a drawing to show change in motor rotation speed for each of the optical spectrum analyzer and the wavelength variable light source in the third embodiment of the invention and is a schematic representation to show change in motor rotation speed for the optical spectrum analyzer in the third embodiment of the invention wherein division is executed and those when division is not executed.

Next, in FIG. 20, the characteristic shown in <30> indicates change in the pulse rate for driving the motor 106 in the third embodiment. Like FIG. 2 or 14, FIG. 20 also shows the motor rotation speed characteristic of the wavelength variable light source 101 (characteristic shown in <1> in the figure) and change in the pulse rate for driving the motor 106 in the first embodiment (characteristic shown in <3> in the figure) for comparison. When the first embodiment is applied, the rotation speed of the motor 106 installed in the optical spectrum analyzer 100 changes continuously throughout the sweep wavelength range; when the third embodiment is applied, the motor rotation speed changes discontinuously for each section and is controlled at a constant pulse rate in each section so as to correspond to the three sections shown in FIG. 19.

To realize sweep by wavelength tracking in the embodiment, if the drive circuit 107 has the capability of varying the pulse rate in the middle of outputting a pulse for driving the motor 106, it is possible to sweep in batch throughout the sweep wavelength range set by the measurer. If the drive circuit 107 is a normal drive circuit which does not have the capability, sweep is once stopped for each section as a division and the conditions of the sweep start wavelength, the sweep end wavelength, the pulse rate, etc., for the next section are set, then sweep in this section is performed, whereby sweep by wavelength tracking in the embodiment can be realized.

The operation of the wavelength characteristic measurement apparatus in the embodiment is the same as that in the second embodiment except the following: In the second embodiment, the motors 106 and 120 are operated at uniform rate throughout the sweep wavelength range. In contrast, the third embodiment is similar to the first embodiment in that the pulse rate of the motor is changed during the sweeping. However, in the first embodiment, the pulse rate of the motor is varied for each measurement wavelength interval calculated from given measurement conditions; in the third embodiment, the pulse rate of the motor 106 is varied for each motor rotation quantity corresponding to each wavelength section as a division. Thus, whenever the position detection circuit 108 detects the rotation quantity of the motor 106 corresponding to the pulse rate change point, it sends wavelength information to the drive circuit 107 as a signal C.

Likewise, in the wavelength variable light source 101, whenever the position detection circuit 121 detects the rotation quantity of the motor 120 corresponding to the pulse rate change point, it sends wavelength information to the drive circuit 125 as a signal C'. The drive circuit 125 varies the pulse rate of the motor 120 for each motor rotation quantity corresponding to each wavelength section as a division. In the embodiment, the signals C and C' need not necessarily be used, as described above. Therefore, the operation of the wavelength characteristic measurement apparatus in the embodiment need not be described in detail.

In the embodiment, the motor rotation speed of the motor 106 installed in the optical spectrum analyzer 100 is found based on the wavelength characteristic relative to the number of rotation pulses of the motor 120 installed in the wavelength variable light source 101, but the invention is not limited to it. For example, conversely, the rotation speed of the motor 120 may be found based on the wavelength characteristic relative to the number of rotation pulses of the motor 106, needless to say.

In the embodiment, the configuration shown in FIG. 1 is taken only as an example as a representative configuration for embodying the invention and the invention is not limited to the configuration in FIG. 1, needless to say. That is, if a circuit or a function is added to the configuration shown in FIG. 1 in the range without departing from the spirit of the invention, it is contained in the scope of the invention, of course. For example, sweep may be started in synchronization and the pulse rate may be varied according to another configuration, needless to say.

As described throughout the specification, in the first to third aspects of the present invention, sweep of the extracted wavelength for extracting a specific wavelength component from measured light from the measured object is synchronized in start with sweep of the signal light wavelength of signal light incident on the measured object. The rotation angle of the first or second spectral element is varied and controlled in accordance with the rotation correction function derived from the extracted wavelength characteristic of the first spectral element and the signal light wavelength characteristic of the second spectral element so that the extracted wavelength and the signal light wavelength match over the sweep wavelength range. This eliminates the need for transferring commands via a communication interface as in the related art; wavelength sweep can be executed in batch, thus measurement data obtained from the measured object can be sampled while the spectral means installed in the optical spectrum analyzer is swept at high speed. Since wavelength sweep in the wavelength variable light source is executed matching the sweep speed in the optical spectrum analyzer, wavelength tracking can be carried out at high speed. The optical spectrum analyzer can sample measurement data with the output wavelength of the wavelength variable light source as the reference, so that wavelength tracking can be accomplished with high wavelength accuracy. Since the extracted wavelength and the signal light wavelength are matched with each other, a problem such that the wavelength difference between the extracted wavelength and the signal light wavelength grows and tracking can be performed only in an extremely narrow wavelength range does not arise, and the wavelength versus loss characteristic of an optical fiber gracing, a dielectric multilayer film filter, an optical component for WDM, etc., can be measured with high wavelength accuracy and at high speed in an extremely wide optical dynamic range. In addition, the optical components can also be measured for a manufacturing inspection, a delivery inspection, and secular change with high wavelength accuracy and at high speed in a wide optical dynamic range.

In the fourth aspect of the present invention, the rotation speeds of the first and second motors for varying the angles of the first and second spectral elements respectively are previously determined so that the signal light wavelength converges in the predetermined wavelength range as the flat wavelength transmission characteristic of the spectral means, and the extracted wavelength and the signal light wavelength are swept over the sweep wavelength range while the first and second motors are rotated at uniform rate in accordance with the motor rotation speeds. This eliminates the need for the first and second drive means to comprise the rotation speed control function following the rotation correction function according to the first to third aspects of the present invention; it is made possible to use general means for performing only uniform rate rotation control in a stationary operation area.

In the fifth aspect of the present invention, the sweep wavelength range is divided into a plurality of wavelength sections each wherein the signal light wavelength converges in the predetermined wavelength range, and the first and second motors are rotated at uniform rate in accordance with the rotation speeds of the motors previously determined for each of the wavelength sections. Thus, if the characteristic of the spectral means installed in the optical spectrum analyzer differs largely from that of the wavelength variable light source or if the flat wavelength area determined by the spectral characteristic of the spectral means is narrow and thus the signal light wavelength output from the wavelength variable light source varies in level exceeding the flat wavelength area, it is also made possible to match the extracted wavelength characteristic of the optical spectrum analyzer and the output signal light wavelength characteristic of the wavelength variable light source with each other throughout the sweep wavelength range or make an arrow difference therebetween. Thus, wavelength tracking can be performed at high speed and measurement can be executed with high wavelength accuracy and at high speed in an extremely wide optical dynamic range.

In the sixth aspect of the present invention, the pulse rates of the first and second motors are varied in the middle of outputting a motor rotation pulse to the motors. Thus, sweep can be executed in batch throughout the sweep wavelength range and it is made possible to perform wavelength tracking at high speed.

In the seventh aspect of the present invention, the sweep operation is once stopped for each of the wavelength sections and conditions are set for the next wavelength section to be swept, then this wavelength section is swept. Thus, it is made possible to use general means for performing only uniform rate rotation control in a stationary operation area as the first and second drive means.

What is claim is:

1. A wavelength characteristic measurement apparatus for measuring an optical wavelength characteristic of an measured object comprising:

a wavelength variable light source for outputting signal light; and an optical spectrum analyzer for measuring a spectral distribution of measured light provided by making the signal light incident on the measured object, wherein the optical spectrum analyzer comprises:
a first spectral clement for extracting a specific wavelength component from the measured light; and
first drive means for varying the angle of the first spectral element, the first driving means for sweeping the extracted wavelength over a predetermined sweep wavelength range,
wherein the wavelength variable light source comprises:
an external oscillator having: a laser element for outputting single mode signal light as the signal light; and a second spectral element for causing the laser element to lase at an arbitrary wavelength; and
second drive means for varying the angle of the second spectral element, the second drive means for sweeping the signal light wavelength of the signal light over the sweep wavelength range,
wherein each of the first and second drive means comprises means for synchronizing the sweep start with each other,
wherein the first and second drive means vary and control the rotation angle of the first or second spectral element in accordance with a rotation correction function derived from an extracted wavelength characteristic relative to the rotation angle of the first spectral element and a signal light wavelength characteristic relative to the rotation angle of the second spectral element to match the extracted wavelength and the signal light wavelength with the sweep wavelength range.

2. The wavelength characteristic measurement apparatus as claimed in claim 1 wherein the first drive means has a first motor for driving the first spectral element and controlling the rotation quantity and rotation speed of the first motor, to match the extracted wavelength characteristic with the signal light wavelength characteristic and to match the extracted wavelength and the signal light wavelength with each other over the sweep wavelength range.

3. The wavelength characteristic measurement apparatus as claimed in claim 1 wherein the second drive means has a second motor for driving the second spectral element and controlling the rotation quantity and rotation speed of the second motor, to match the extracted wavelength characteristic with the signal light wavelength characteristic and to match the extracted wavelength and the signal light wavelength with each other over the sweep wavelength range.

4. A wavelength characteristic measurement apparatus for measuring an optical wavelength characteristic of an measured object comprising:
a wavelength variable light source for outputting signal light; and an optical spectrum analyzer for measuring a spectral distribution of measured light provided by making the signal light incident on the measured object, wherein the optical spectrum analyzer comprises;
a first spectral element for extracting a specific wavelength component from the measured light, the first spectral element having a wavelength transmission characteristic wherein the maximum transmission quantities are flat over a predetermined wavelength range preceding and following the extracted wavelength as the center relative to a preset resolution; and
first drive means for varying the angle of the first spectral element and sweeping the extracted wavelength over a predetermined sweep wavelength range,
the wavelength variable light source comprises:
an external oscillator comprising: a laser element for outputting single mode signal light as the signal light; and a second spectral element for causing the laser element to lase at an arbitrary wavelength; and
second drive means for varying the angle of the second spectral element and sweeping the signal light wavelength of the signal light over the sweep wavelength range,
wherein rotation speeds of the first and second motors for varying the angles of the first and second spectral elements respectively are previously determined no gather and bundle the signal light wavelength in the predetermined wavelength range and the first and second drive means rotate the first a second motors at uniform rate in accordance with the rotation speeds.

5. The wavelength characteristic measurement apparatus as claimed in claim 4 wherein the sweep wavelength range is divided into a plurality of wavelength sections each wherein the signal light wavelength converses in the predetermined wavelength range; and
wherein the first and second drive means rotate the first and second motors at uniform rate in accordance with the rotation speeds of the first and second motors previously determined for each of the wavelength sections.

6. The wavelength characteristic measurement apparatus as claimed in claim 5 wherein the first and second drive means vary the pulse rates of the first and second motors in the middle of outputting a motor rotation pulse to the first and second motors.

7. The wavelength characteristic measurement apparatus as claimed in claim 5 wherein the first and second drive means once stop the sweep operation for each of the wavelength sections and set conditions concerning the next wavelength section to be swept for sweeping this wavelength section.

* * * * *